(12) United States Patent
Park et al.

(10) Patent No.: US 7,710,665 B2
(45) Date of Patent: May 4, 2010

(54) IMAGING OPTICAL SYSTEM

(75) Inventors: Cheon Ho Park, Gyunggi-do (KR); Moon Sik Jung, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/232,385

(22) Filed: Sep. 16, 2008

(65) Prior Publication Data
US 2009/0122423 A1    May 14, 2009

(30) Foreign Application Priority Data
Nov. 8, 2007  (KR) ............... 10-2007-0113751
Dec. 21, 2007 (KR) ............... 10-2007-0135553

(51) Int. Cl.
  *G02B 9/60* (2006.01)
  *G02B 9/34* (2006.01)
  *G02B 3/02* (2006.01)

(52) U.S. Cl. .................. 359/767; 359/772; 359/714

(58) Field of Classification Search .............. 359/714, 359/715, 763, 764, 767, 773
See application file for complete search history.

(56) References Cited

U.S. PATENT DOCUMENTS
7,342,726 B2 *  3/2008  Kim ..................... 359/666

FOREIGN PATENT DOCUMENTS
JP        2005-234068       9/2005

* cited by examiner

*Primary Examiner*—William C Choi

(57) ABSTRACT

There is provided a high-definition imaging optical system including: an aperture stop; a first lens disposed at an image side of the aperture stop, the first lens having a positive refractive power and having a convex object-side surface; a second lens disposed at an image side surface of the first lens; a third lens disposed at an image side surface of the second lens; a fourth lens having a convex image-side surface and having a positive refractive power; and a fifth lens having a concave image-side surface and having a negative refractive power, wherein a combined refractive power of the second and third lenses is negative. The optical system is high-performing and compact and can be further improved in resolution. Also, the optical system can correct chromatic aberration and improve color fringing in the case of indoor or outdoor photographing.

31 Claims, 16 Drawing Sheets

IMAGING OPTICAL SYSTEM

CROSS-REFERENCE TO RELATED APPLICATIONS

This application claims the priorities of Korean Patent Application No. 2007-113751 filed on Nov. 8, 2007 and Korean Patent Application No. 2007-135553 filed on Dec. 21, 2007, with the Korean Intellectual Property Office, the disclosures of which are incorporated herein by reference.

BACKGROUND OF THE INVENTION

1. Field of the Invention

The present invention relates to an imaging optical system, and more particularly, to an imaging optical system with high resolution and compactness, which is mounted on a mobile telecommunication terminal and a personal digital assistant (PDA) and easily installed on a surveillance camera, a digital camera, and a personal computer (PC) camera to photograph an object more clearly.

2. Description of the Related Art

In general, a camera module lens for use in a mobile telecommunication terminal is formed of two and three lenses for a low-pixel grade, and three and four lenses for a high-pixel grade.

That is, the lenses applied to the camera module designed as a low-pixel grade are relatively large in pixel size and require relatively low screen resolution. Accordingly, the camera module may be formed of three lenses, or two lenses if necessary.

However, the lenses applied to the camera module designed as a high pixel grade are small in pixel size and require very high screen resolution. Thus, the camera module is formed of three or four lenses.

The imaging optical system configured with three lenses experiences difficulty in correction of chromatic aberration. Thus, the imaging optical system may be configured with four lenses to ensure easy correction of chromatic aberration, thereby enhancing screen resolution.

SUMMARY OF THE INVENTION

An aspect of the present invention provides a high-definition imaging optical system ensuring high performance and compactness, and capable of increasing resolution and correcting chromatic aberration superbly, thereby improving color fringing in the case of indoor and outdoor photographing.

According to an aspect of the present invention, there is provided an imaging optical system including: an aperture stop; a first lens disposed at an image side of the aperture stop, the first lens having a positive refractive power and the front surface of the first lens having a convex object-side surface; a second lens disposed at an image side surface of the first lens; a third lens disposed at an image side surface of the second lens; a fourth lens having a positive refractive power and the rear surface of the fourth lens having a convex image-side surface; and a fifth lens having a negative refractive power and the rear surface of the fifth lens having a concave image-side surface, wherein a combined refractive power of the second and third lenses is negative.

The second and third lenses may be cemented together or spaced apart from each other at a predetermined distance.

The second lens may have a positive refractive power and the third lens may have a negative refractive power.

One of the fourth and fifth lenses may have at least one surface formed of an aspherical surface.

The imaging optical system may have a dimension in an optical axis direction satisfying following condition 1:

$$1.0 < TL/f < 1.5 \qquad \text{condition 1,}$$

where TL is a distance from the object-side surface of the first lens to an image plane and f is a total focal length of the optical system.

The first lens has a refractive power satisfying following condition 2-1:

$$0.5 < f1/f < 1.0 \qquad \text{condition 2-1,}$$

where f1 is a focal length of the first lens.

The first, second and third lenses may have a refractive power satisfying following condition 3-1:

$$1.1 < f123/f < 1.5 \qquad \text{condition 3-1,}$$

where f123 is a combined focal length of the first, second and third lenses.

The fourth lens has a shape satisfying following condition 4-1:

$$-2.5 < R\_L4F/f < -1.0 \qquad \text{condition 4-1,}$$

where R_L4F is a radius of curvature of an object-side surface of the fourth lens.

The second and third lenses may have Abbe numbers satisfying following conditions 5-1 and 5-2, respectively:

$$45 < V\_L2 < 71 \qquad \text{condition 5-1}$$

$$23 < V\_L3 < 40 \qquad \text{condition 5-2,}$$

where V_L2 is an Abbe number of the second lens and V_L3 is an Abbe number of the third lens.

The first and fifth lenses may have a refractive power satisfying following condition 6-1:

$$-1.4 < f4/f5 < -0.8 \qquad \text{condition 6-1,}$$

where f4 is a focal length of the fourth lens and f5 is a focal length of the fifth lens.

The second lens may have a negative refractive power and the third lens may have a positive refractive power.

One of the fourth and fifth lenses may have at least one surface formed of an aspherical surface.

The imaging optical system may have a dimension in an optical axis direction satisfying following condition 1:

$$1.0 < TL/f < 1.5 \qquad \text{condition 1,}$$

where TL is a distance from the object-side surface of the first lens to an image plane and f is a total focal length of the optical system.

The first lens may have a refractive power satisfying following condition 2-2:

$$0.4 < f1/f < 0.9 \qquad \text{condition 2-2,}$$

where f1 is a focal length of the first lens.

The first, second and third lenses may have a refractive power satisfying following condition 3-2:

$$1.1 < f123/f < 1.7 \qquad \text{condition 3-2,}$$

f123 is a combined focal length of the first and second lenses.

The fourth lens may have a shape satisfying following condition 4-1:

$$-3.0 < R\_L4F/f < -0.0 \qquad \text{condition 4-1,}$$

where R_L4F is a radius of curvature of an object-side surface of the fourth lens.

The first, second and third lenses may have Abbe numbers satisfying following conditions 5-3, 5-4 and 5-5, respectively:

$50 < V\_L1 < 70$     condition 5-3, $25 < V\_L2 < 45$     condition 5-4, $50 < V\_L3 < 70$     condition 5-5, where V_L1 is an Abbe number of the first lens, V_L2 is an Abbe number of the second lens and V_L3 is an Abbe number of the third lens.

The first lens and fifth lenses may have a refractive power satisfying following condition 6-2:

$-1.4 < f4/f5 < -0.7$     condition 6-2, where f4 is a focal length of the fourth lens and f5 is a focal length of the fifth lens.

The imaging optical system of claim 1 may have a dimension in an optical axis direction satisfying following condition 1, and wherein the first lens has a refractive power satisfying following condition 2-1:

$1.0 < TL/f < 1.5$     condition 1, $0.5 < f1/f < 1.0$     condition 2-1, where TL is a distance from the object-side surface of the first lens to an image plane, f is a total focal length of the optical system and f1 is a focal length of the first lens.

The first, second and third lenses may have a refractive power satisfying following condition 3-1:

$1.1 < f123/f < 1.5$     condition 3-1, where f123 is a combined focal length of the first, second and third lenses.

The imaging optical system may have a dimension in an optical axis direction satisfying following condition 1, and wherein the first lens has a refractive power satisfying following condition 2-2:

$1.0 < TL/f < 1.5$     condition 1, $0.4 < f1/f < 0.9$     condition 2-2, where TL is a distance from the object-side surface of the first lens to an image plane, f is a total focal length of the optical system and f1 is a focal length of the first lens.

The first, second and third lenses may have a refractive power satisfying following condition 3-2:

$1.1 < f123/f < 1.7$     condition 3-2, where f123 is a combined focal length of the first, second and third lenses.

According to another aspect of the present invention, there is provided an imaging optical system including: an aperture stop; a first lens disposed at an image side of the aperture stop, the first lens having a positive refractive power and having both convex surfaces; a second lens disposed at an image-side surface of the first lens; a third lens disposed at an image-side surface of the second lens, the third lens cemented to the second lens or spaced apart from the second lens at a predetermined distance; a fourth lens having a positive refractive power and having a convex image-side surface; and a fifth lens having a negative refractive power and having a concave image-side surface, the fifth lens having at least one surface formed of an aspherical surface, wherein a combined refractive power of the second and third lenses is negative.

The imaging optical system may have a dimension in an optical axis direction satisfying following condition 1:

$1.0 < TL/f < 1.5$     condition 1, where TL is a distance from an object-side surface of the first lens to an image plane and f is a total focal length of the optical system.

The second lens may have a positive refractive power and the third lens may have a negative refractive power.

The second lens may have a negative refractive power and the third lens may have a positive refractive power.

The fifth lens may have a point of inflection formed on the image-side surface thereof.

The fourth lens may have at least one surface formed of an aspherical surface.

The fifth lens may have the image-side surface convexed toward an object side near an optical axis and convexed toward an image plane at peripheral portions.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

FIGS. 1, 3, 5, 7, 9, 11, 13, 15, 17, 19, 21, 23, 25, 27, 29 and 31 are lens configuration views illustrating a lens of an imaging optical system according to first to sixteenth embodiments of the invention, respectively. In the following lens configuration views, the thicknesses, sizes and shapes of the lenses may be exaggerated for clarity. In particular, the shapes of spherical or aspherical surfaces shown in the views are only exemplary and should not be construed as limiting.

As shown in FIGS. 1, 3, 5, 7, 9, 11, 13, 15, 17, 19, 21, 23, 25, 27, 29 and 31, in the present embodiments, the imaging optical system includes an aperture stop S disposed most adjacent to an object side to eliminate unnecessary light. Also, the imaging optical system includes, sequentially from the object side, a first lens group G1, a second lens group G2, a third lens group G2, a third lens group G3 and a fourth lens group G4.

The first lens group G1 includes a first lens L1, and the first lens L1 has a convex object-side surface 1 or both convex side surfaces 1 and 2, and has a positive refractive power.

The second lens group G2 has an overall negative refractive power, and includes a second lens L2 and a third lens L3. The second lens L2 has an image-side surface 4 opposing an object-side surface of the third lens L3 to be cemented together or separated from each other.

Figure 21:
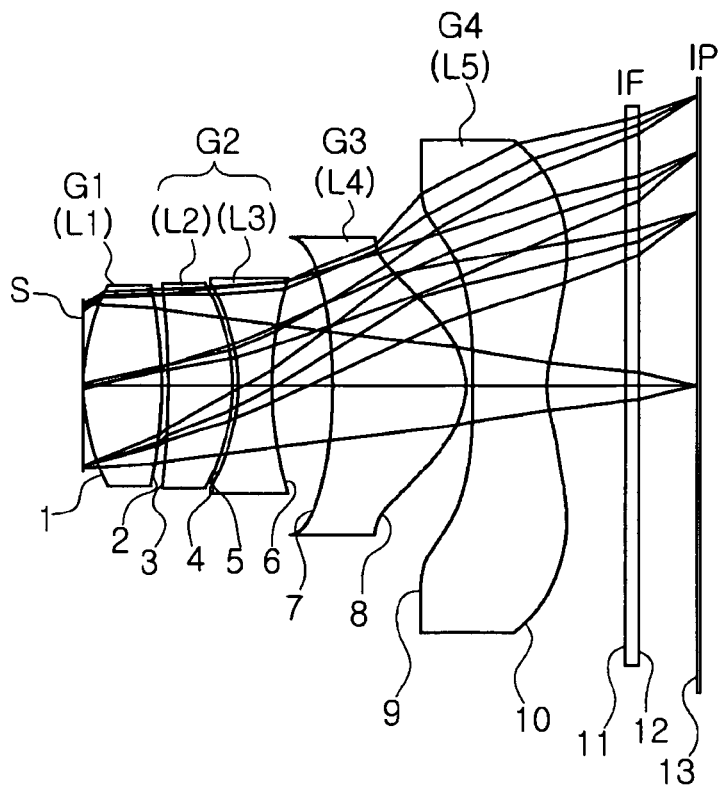
FIG. 21 is a lens configuration view illustrating a high-definition imaging optical system according to an eleventh embodiment of the invention.
Figure 23:
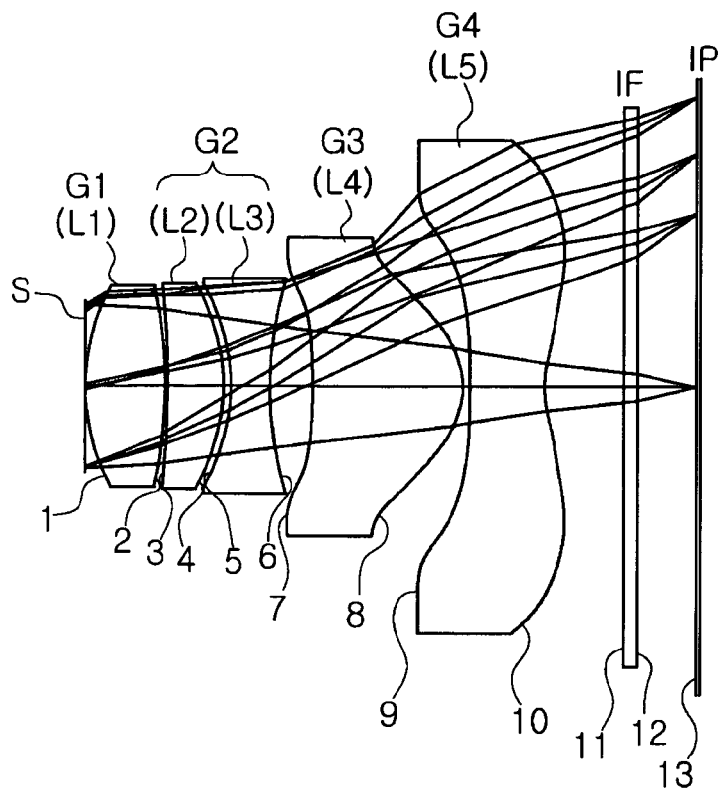
FIG. 23 is a lens configuration view illustrating a high-definition imaging optical system according to a twelfth embodiment of the invention.

The second lens L2 has the convex image-side surface 4, and has a positive refractive power. The third lens L3 has the concave object-side surface, and has a negative refractive power. As shown in FIGS. 1, 3, 5, 7, 9, 11, 13, 15, 17, and 19, these second and third lenses are illustrated to be cemented together but not limited thereto. As shown in FIGS. 21 and 23, the second and third lenses may be separated from each other.

Meanwhile, as shown in FIGS. 25, 27, 29 and 31, the second lens L2 has the concave image-side surface 4, and has a negative refractive power. Also, the third lens L3 has the convex object-side surface and a positive refractive power. These second and third lenses L2 and L3 are illustrated to be cemented together but not limited thereto. The second and third lenses L2 and L3 may be separated from each other as described above.

The third lens group G3 includes a fourth lens L4 and the fourth lens L4 has a convex image-side surface 7 and has a positive refractive power.

The fourth lens group G4 includes a fifth lens L5 and the fifth lens L5 has a negative refractive power.

Here, the fourth lens L4 and the fifth lens L5 each may have at least one of an object-side surface 6 and 8 and an image-side surface 7 and 9 formed of an aspherical surface.

Moreover, at least two of the plurality of lenses constituting the first lens group G1 to fourth lens group G4 may be formed of a plastic lens. This allows the imaging optical system to be manufactured in mass production at a lower cost and with a smaller size.

Furthermore, the fourth to fifth lenses L4 and L5 each may have at least one surface formed of an aspherical surface, thereby leading to a more compact system than in a case where only spherical lenses are employed.

Also, the fifth lens L5 of the fourth lens group G4 has an image-side surface 9 convexed toward the object side at a center and convexed toward the image-side at peripheral portions. A point of inflection is formed on the image-side surface 9 of the fifth lens L5.

Meanwhile, an infra red (IR) filter is disposed behind the fourth lens group (G4). The IR filter is may be substituted by another filter or omitted. The IR filter is construed not to have a fundamental influence on optical properties of the present invention.

Also, the image sensor is configured as a charged coupled device (CCD) and a complementary metal oxide semiconductor (CMOS). The IF is disposed behind, corresponding to the image plane (photosensitive surface) 12 receiving an image imaged by the lens.

With this overall configuration, operational effects of following conditions 1 to 6-2 will be examined hereunder.

Condition 1 prescribes high-definition and decrease in a total length of the optical system:

$$1.0 < TL/f < 1.5 \qquad \text{condition 1,}$$

where TL is a distance from the object-side surface 1 of the first lens L1 of the first lens group G1 to the image plane 12.

Deviation from the lower limit results in severe coma and astigmatism, thereby rendering it hard to attain a clear image. Also, deviation from the lower limit causes a center and peripheral portions of an image plane to be displaced, and makes it impossible to realize high-definition on a screen overall.

Moreover, deviation from the lower limit increases the Petzval Sum and accordingly, curvature of the image plane. On the other hand, deviation from the upper limit lengthens a distance from the object-side surface 1 of the first lens L1 to the image plane 12, thus posing difficulty to the design of a compact optical system:

$0.5 < f1/f < 1.0$      condition 2-1, $0.4 < f1/f < 0.9$      condition 2-2, where f1 is a focal length of the first lens group G1.

When condition 2-1 and condition 2-2 are satisfied, the first lens group is reduced in refractive power and the optical system is decreased in an overall dimension thereof. Also, the optical system is inhibited from spherical aberration and coma flare, thereby achieving superior image quality. Deviation from the lower limit leads to severe spherical aberration and coma to deteriorate image quality. On the other hand, deviation from the upper limit decreases a refractive power of the first lens L1 and causes a light beam originated from the object-side surface 1 of the first lens L1 to meet on an optical axis at a distant position, thereby rendering it hard to produce a compact optical system.

Condition 3-1 and condition 3-2 govern refractive power of the first and second lens groups G1 and G2:

$1.1 < f123/f < 1.5$      condition 3-1, $1.1 < f123/f < 1.7$      condition 3-2, where f123 is a combined focal length of the first lens group G1 and the second lens group G2. In the present embodiment, f123 denotes a combined focal length of the first lens L1, the second lens L2 and the third lens L3.

When conditions 3-1 and 3-2 are satisfied, the optical system suffers minimum color fringing which may adversely affect image quality and can be reduced in overall size. With deviation from the lower limit, an image point of a light beam incident toward a point of the image surface or image plane for each wavelength departs considerably from the intended point to cause color fringing and thus degrade image quality. On the other hand, deviation from the upper limit decreases a refractive power of the incident light beam to lengthen a distance between the object-side surface 1 of the first lens group G1 to the image plane 12, which hardly leads to compactness of the optical system.

Condition 4-1 and condition 4-2 govern shape of the fourth lens L1:

$-2.5 < R\_L4F/f < -1.0$      condition 4-1, $-3.0 < R\_L4F/f < 0.0$      condition 4-2 where R_L4F is a radius of curvature of an object-side surface 6 of the fourth lens L4.

When condition 4-1 and condition 4-2 are satisfied, an object is minimally deformed in shape and the optical system can be reduced in overall size. Deviation from the lower limit breaks symmetry in the optical system and thus significantly aggravates distortion. Meanwhile, deviation from the upper limit may lead to very small distortion, but causes the image point to be shifted backward. This leads to a greater length from the object-side surface 1 of the first lens L1 to the image plane 12 to increase a total length of the imaging optical system.

Condition 5-1, condition 5-2, condition 5-3, condition 5-4 and condition 5-5 prescribe Abbe numbers of the first, second and third lenses L1, L2, and L3:

$45 < V\_L2 < 71$      condition 5-1, $23 < V\_L3 < 40$      condition 5-2, $50 < V\_L1 < 70$      condition 5-3, $25 < V\_L2 < 45$      condition 5-4, $50 < V\_L3 < 70$      condition 5-5, where V_L1 is an Abbe number of the first lens, V_L2 is an Abbe number of the second lens, and V_L3 is an Abbe number of the third lens.

When these conditions are met, the third lens L3 with a negative refractive power can properly correct chromatic aberration occurring in the second lens L2.

Condition 6-1 and condition 6-2 govern an angle of a chief ray incident on the image plane 12:

$-1.4 < f4/f5 < -0.8$      condition 6-1, $-1.4 < f4/f5 < -0.7$      condition 6-2, where f4 is a focal length of the fourth lens L4 and f5 is a focal length of the fifth lens L5.

In the optical system using an image sensor such as a complementary metal-oxide semiconductor (CMOS) or a charge-coupled device (CCD), a micro lens array is appropriately disposed on an imaging surface of the image sensor to obtain superb light receiving sensitivity. This increases an incident angle of the chief ray. That is, an incident angle of the chief ray with superior light reception sensitivity is determined.

Therefore, deviation from condition 6-1 and condition 6-2 dramatically deteriorates light reception sensitivity of the image sensor to degrade image quality or darken the image.

Hereinafter, the present invention will be described in detail by way of detailed examples.

The aspherical surfaces used in each of following embodiments are obtained by following known Equation 1, in which 'E and a number following the E' used in conic constants K and aspherical coefficients A, B, C, D and E represent a 10's power. For example, E+01 and E−02 represent $10^1$ and $10^{-2}$, respectively. For example E21 denotes $10^{21}$ and E−02 denotes $10^{-2}$.

$$z(r) = \frac{cr^2}{1+\sqrt{1-(1+k)c^2r^2}} + Ar^3 + Br^4 + Cr^5 + Dr^6 + Er^7 + Fr^8 + Gr^9 + Hr^{10} + Ir^{11} + Jr^{12} + Kr^{13} + Lr^{14},$$ Equation 1 where Z is a distance toward an optical axis from a vertex of a lens, r is a distance toward a direction perpendicular to an optical axis, c is a radius of curvature on a vertex of a lens, K is a conic constant and A, B, C, D and E are aspherical coefficients.

First Embodiment

Following Table 1 shows numeric values of the lens system according to a first embodiment of the invention.

Figure 1:
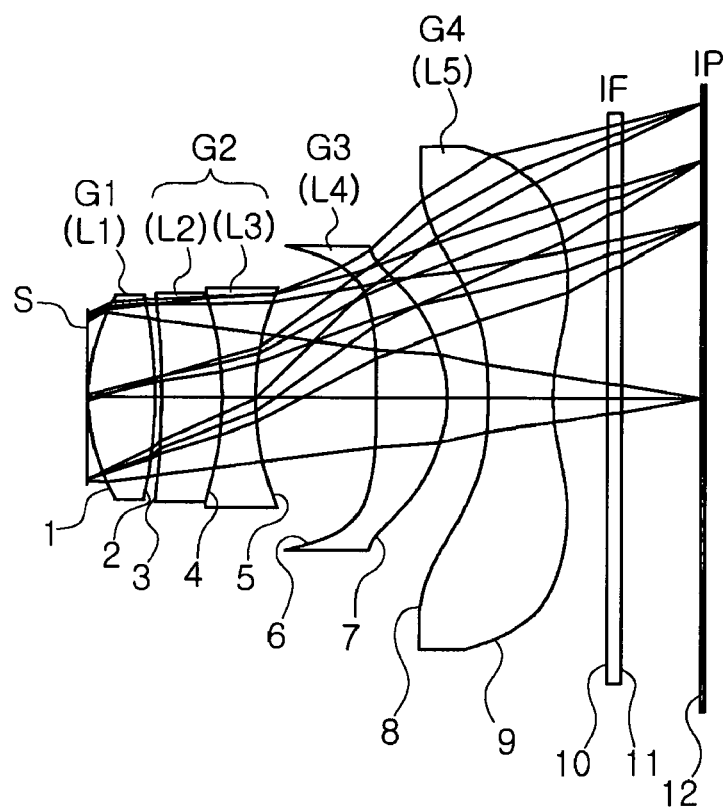
FIG. 1 is a lens configuration view illustrating a high-definition imaging optical system according to a first embodiment of the invention.
Figures 2A, 2B, 2C:
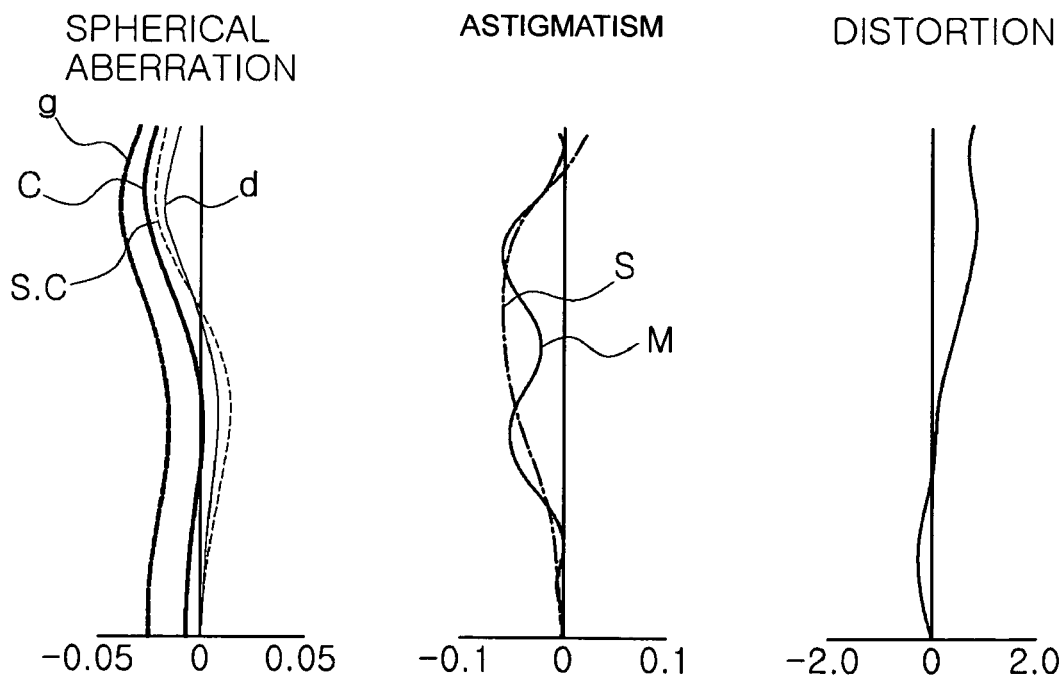
FIGS. 2A to 2C are graphs illustrating aberrations of the optical system shown in FIG. 1.

FIG. 1 is a view illustrating a lens arrangement of the high-definition imaging optical system according to the first embodiment of the present invention, and FIGS. 2A to 2C show aberrations of the embodiment shown in Table 1 and FIG. 1.

Also, in the drawings illustrating spherical aberration, a line d denotes a wavelength of 587.56 nm, a line g denotes a wavelength of 435.83 nm, a line c denotes a wavelength of 656.27 nm and S.C denotes sine condition. In the graphs illustrating astigmatism, "S" represents sagital and "T" represents tangential.

In the first embodiment, an effective focal length f is 5.686 mm, an F number Fno is 2.8, an angle of view is 64 degrees, a total length TL from an object-side surface of the first lens group to the image plane is 6.50 mm.

A focal length f1 of the first lens L1 is 3.74 mm, a combined focal length of the second and third lenses L2 and L3, i.e., a focal length of the second lens group designated with f23 is −5.238 mm, a focal length f4 of the fourth lens L4 is 3.735 mm and a focal length f5 of the fifth lens L5 is −3.169 mm.

TABLE 1

| Surface No. | Radius of curvature (R) | Thickness or distance (t) | Refractive index ($N_d$) | Abbe number ($V_d$) | Remark |
|---|---|---|---|---|---|
| *1  | 2.649   | 0.700 | 1.583  | 59.5 | First lens |
| *2  | −7.776  | 0.060 |        |      |            |
| 3   | −14.607 | 0.650 | 1.697  | 55.5 | Second lens |
| 4   | −4.577  | 0.350 | 1.620  | 36.3 | Third lens |
| 5   | 3.964   | 1.300 |        |      |            |
| *6  | −11.714 | 0.750 | 1.530  | 55.8 | Fourth lens |
| *7  | −1.731  | 0.450 |        |      |            |
| *8  | −4.628  | 0.700 | 1.530  | 55.8 | Fifth lens |
| *9  | 2.775   | 0.600 |        |      |            |
| 10  | ∞       | 0.145 | 1.5168 | 64.2 | Optical filter |
| 11  | ∞       | 0.820 |        |      |            |
| 12  | ∞       | 0.000 |        |      | Image plane |

In Table 1, * represents an aspherical surface, and values of conic coefficient K and aspherical coefficients A, B, C, D, E and F in the first embodiment according to Equation 1 are noted in Table 2 below.

TABLE 2

| Surface No. | K | A | B | C |
|---|---|---|---|---|
| 1 | −0.69117234E+00 | −0.18853279E−03 | −0.12652153E−02 | 0.15392294E−02 |
| 2 | 0.50546153E+01  | 0.39975578E−02  | −0.64048439E−02 | 0.48814698E−02 |
| 6 | −0.30965193E+02 | −0.97251149E−03 | −0.18413714E−01 | −0.24845336E−02 |
| 7 | −0.79579980E+01 | −0.72312563E−01 | 0.24649754E−01  | −0.10068218E−01 |
| 8 | −0.11115667E+03 | −0.77440323E−01 | 0.98133269E−02  | 0.55827380E−02 |
| 9 | −0.82783309E+01 | −0.50290519E−01 | 0.12282150E−01  | −0.19267219E−02 |

| Surface No. | D | E | F |
|---|---|---|---|
| 1 | −0.27466579E−02 |                 |                 |
| 2 | −0.38993474E−02 |                 |                 |
| 6 | 0.29357524E−02  | −0.73399888E−03 |                 |
| 7 | 0.16019546E−02  | 0.96125115E−04  |                 |
| 8 | −0.20210129E−02 | 0.25215715E−03  | −0.11173052E−04 |
| 9 | 0.15793272E−03  | −0.59134683E−05 |                 |

Second Embodiment

Following Table 3 shows numeric values of the lens system according to a second embodiment of the present invention.

Figure 3:
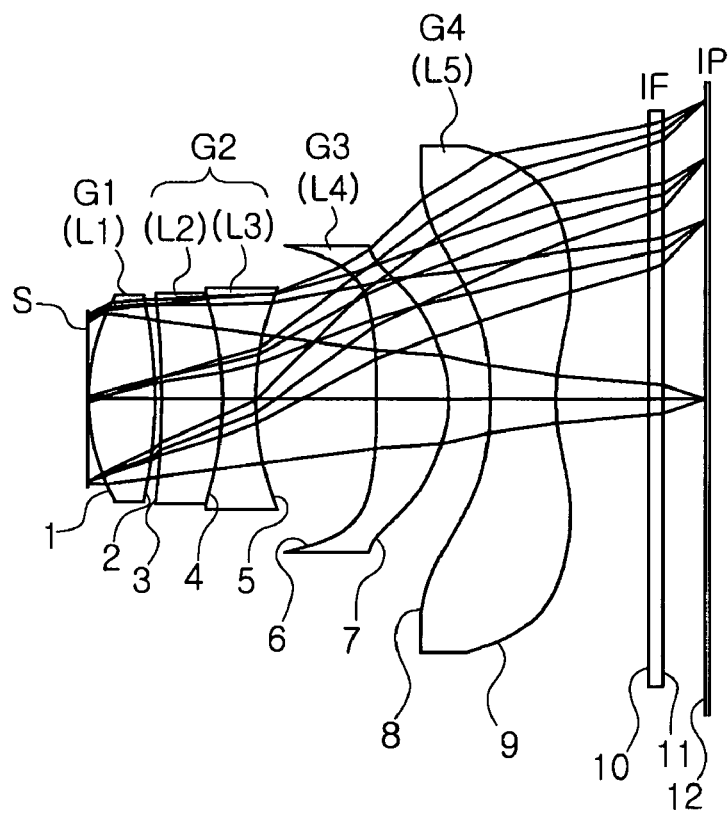
FIG. 3 is a lens configuration view illustrating a high-definition imaging optical system according to a second embodiment of the invention.
Figure 4A:
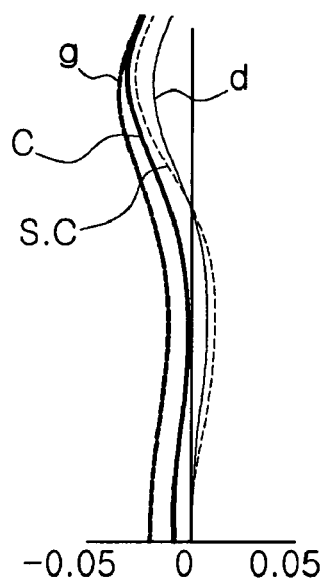
FIGS. 4A to 4C are graphs illustrating aberrations of the optical system shown in FIG. 3.
Figure 4B:
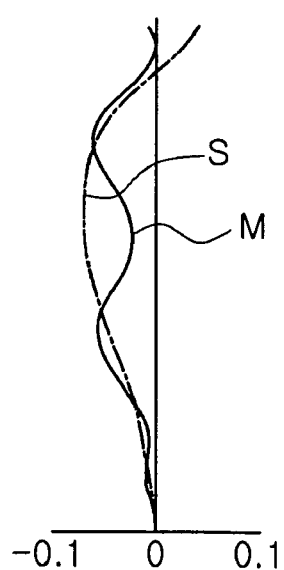
Figure 4C:
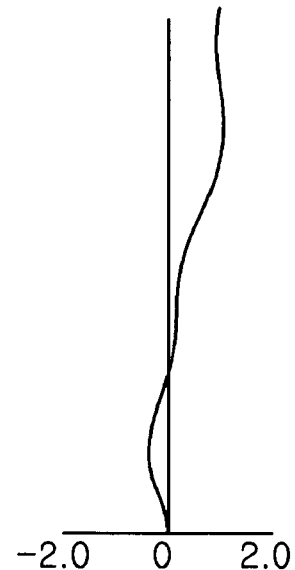

FIG. 4 is a view illustrating a lens arrangement of the high-definition imaging optical system according to the second embodiment of the invention, and FIGS. 4A to 4C show aberrations of the embodiment shown in Table 3 and FIG. 3.

In the second embodiment, an effective focal length f is 5.683 mm, an F number Fno is 2.8, an angle of view 2ω is 64 degrees, a total length TL from an object-side surface of the first lens group to the image plane is 6.50 mm.

A focal length f1 of the first lens L1 is 3.651 mm, a combined focal length of the second and third lenses L2 and L3, i.e., a focal length of the second lens group designated with f23 is −5.538 mm, a focal length f4 of the fourth lens L4 is 4.070 mm and a focal length f5 of the fifth lens L5 is −3.523 mm.

TABLE 3

| Surface No. | Radius of curvature (R) | Thickness or distance (t) | Refractive index ($N_d$) | Abbe number ($V_d$) | Remark |
|---|---|---|---|---|---|
| *1  | 2.689   | 0.700 | 1.580  | 60.8 | First lens |
| *2  | −9.018  | 0.060 |        |      |            |
| 3   | −42.607 | 0.650 | 1.697  | 55.5 | Second lens |
| 4   | −5.138  | 0.350 | 1.620  | 36.3 | Third lens |
| 5   | 3.482   | 1.250 |        |      |            |
| *6  | −10.116 | 0.750 | 1.530  | 55.8 | Fourth lens |
| *7  | −1.824  | 0.540 |        |      |            |
| *8  | −5.637  | 0.700 | 1.530  | 55.8 | Fifth lens |
| *9  | 2.912   | 1.000 |        |      |            |
| 10  | ∞       | 0.145 | 1.5168 | 64.2 | Optical filter |
| 11  | ∞       | 0.370 |        |      |            |
| 12  | ∞       | 0.000 |        |      | Image plane |

In Table 1, * represents an aspherical surface, and values of conic coefficient K and aspherical coefficients A, B, C, D, E and F in the second embodiment according to Equation 1 are noted in Table 4 below.

TABLE 4

| Surface No. | K | A | B | C |
|---|---|---|---|---|
| 1 | −0.62906695E+00 | −0.15865460E−02 | −0.21667106E−02 | 0.23593282E−02 |
| 2 | 0.74293690E+01 | 0.3509336E−02 | −0.69489026E−02 | 0.52241357E−02 |
| 6 | −0.30906645E+02 | −.34341795E−02 | −0.18976439E−01 | −0.15164448E−02 |
| 7 | −0.76192476E+01 | −0.73365905E−01 | 0.23122915E−01 | −0.97970961E−02 |
| 8 | −0.15023362E+03 | −0.79259423E−01 | 0.97681842E−02 | 0.54529934E−02 |
| 9 | −0.69782751E+01 | −0.56644332E−01 | 0.14102023E−01 | −0.22223547E−02 |

| Surface No. | D | E | F |
|---|---|---|---|
| 1 | −0.29911897E−02 | | |
| 2 | −0.38865372E−02 | | |
| 6 | 0.27381624E−02 | −0.63827435E−03 | |
| 7 | 0.16668017E−02 | 0.10266339E−03 | |
| 8 | −0.19969607E−02 | 0.25354538E−03 | 0.11464844E−04 |
| 9 | 0.18282794E−03 | −0.68001721E−05 | |

Third Embodiment

Following Table 5 shows numeric values of the lens system according to a third embodiment of the present invention.

Figure 5:
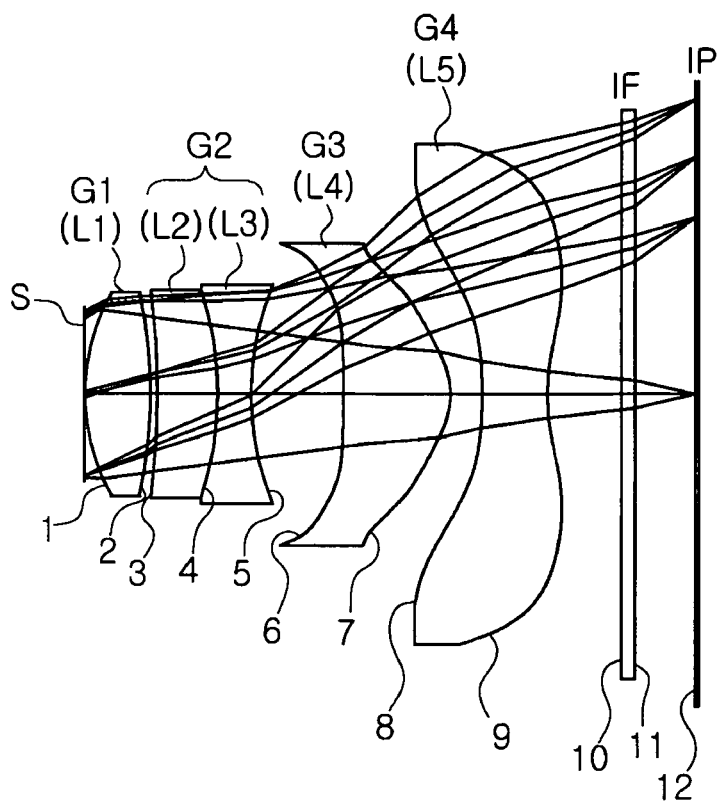
FIG. 5 is a lens configuration view illustrating a high-definition imaging optical system according to a third embodiment of the invention.
Figures 6A, 6B, 6C:
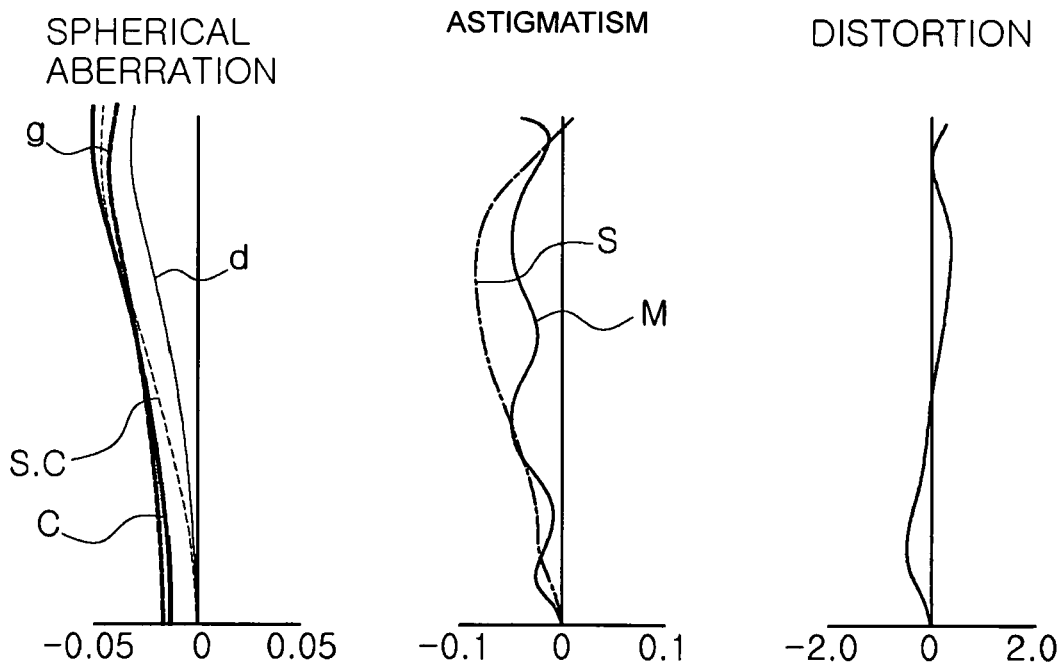
FIGS. 6A to 6C are graphs illustrating aberrations of the optical system shown in FIG. 5.

FIG. 6 is a view illustrating a lens arrangement of the high-definition imaging optical system according to the second embodiment of the invention, and FIGS. 6A to 6C show aberrations of the embodiment shown in Table 5 and FIG. 5.

In the third embodiment, an effective focal length f is 5.699 mm, an F number Fno is 2.8, an angle of view 2ω is 64 degrees, a total length TL from an object-side surface of the first lens group to the image plane is 6.80 mm.

A focal length f1 of the first lens L1 is 3.554 mm, a combined focal length of the second and third lenses L2 and L3, i.e., a focal length of the second lens group designated with f23 is −5.029 mm, a focal length f4 of the fourth lens L4 is 2.776 mm and a focal length f5 of the fifth lens L5 is −2.646 mm.

TABLE 5

| Surface No. | Radius of curvature (R) | Thickness or distance (t) | Refractive index ($N_d$) | Abbe number ($V_d$) | Remark |
|---|---|---|---|---|---|
| *1 | 2.735 | 0.750 | 1.583 | 59.5 | First lens |
| *2 | −7.689 | 0.060 | | | |
| 3 | −13.023 | 0.750 | 1.697 | 55.5 | Second lens |
| 4 | −3.880 | 0.350 | 1.620 | 24.0 | Third lens |
| 5 | 3.860 | 1.130 | | | |
| *6 | −9.810 | 0.960 | 1.530 | 56.4 | Fourth lens |
| *7 | −1.323 | 0.230 | | | |
| *8 | −4.397 | 0.720 | 1.530 | 56.4 | Fifth lens |
| *9 | 2.176 | 1.000 | | | |
| 10 | ∞ | 0.145 | 1.5168 | 64.2 | Optical filter |
| 11 | ∞ | 0.725 | | | |
| 12 | ∞ | 0.000 | | | Image plane |

In Table 5, * represents an aspherical surface, and values of conic coefficient K and aspherical coefficients A, B, C, D, E and F in the third embodiment according to Equation 1 are noted in Table 6 below.

TABLE 6

| Surface No. | K | A | B | C |
|---|---|---|---|---|
| 1 | −0.10428486E+01 | 0.44918087E−02 | −0.18359361E−02 | 0.20892503E−02 |
| 2 | −0.98553664E+01 | 0.25552261E−02 | −0.37689347E−02 | 0.30459730E−02 |
| 6 | −0.61668088E+01 | −0.31238987E−02 | −0.17622739E−01 | 0.29731584E−02 |
| 7 | −0.54585377E+01 | −0.71119551E−01 | 0.20222929E−01 | −0.40913670E−02 |
| 8 | −0.11865263E+03 | −0.62162238E−01 | 0.74483816E−02 | 0.47877940E−02 |
| 9 | −0.10484067E+02 | −0.38477969E−01 | 0.82158158E−02 | −0.12012904E−02 |

| Surface No. | D | E | F |
|---|---|---|---|
| 1 | −0.16205444E−02 | | |
| 2 | −0.20917233E−02 | | |
| 6 | −0.26117480E−03 | −0.24227073E−05 | |
| 7 | −0.65337363E−03 | 0.35863311E−03 | |
| 8 | −0.19254260E−02 | 0.27713874E−03 | −0.14242005E−04 |
| 9 | 0.84357363E−04 | −0.26663693E−05 | |

Fourth Embodiment

Following Table 7 shows numeric values of the lens system according to a fourth embodiment of the present invention.

Figure 7:
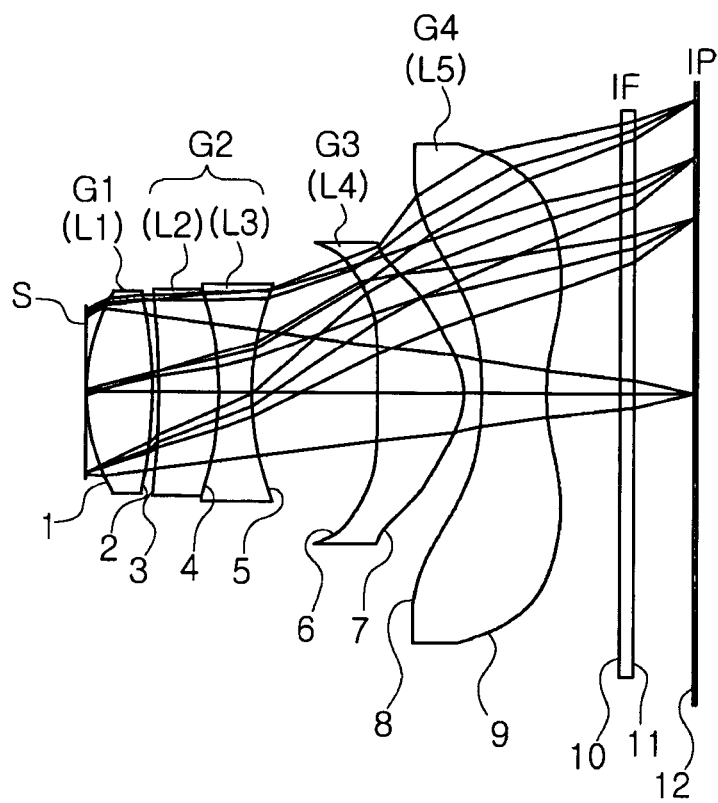
FIG. 7 is a lens configuration view illustrating a high-definition imaging optical system according to a fourth embodiment of the invention.
Figures 8A, 8B, 8C:
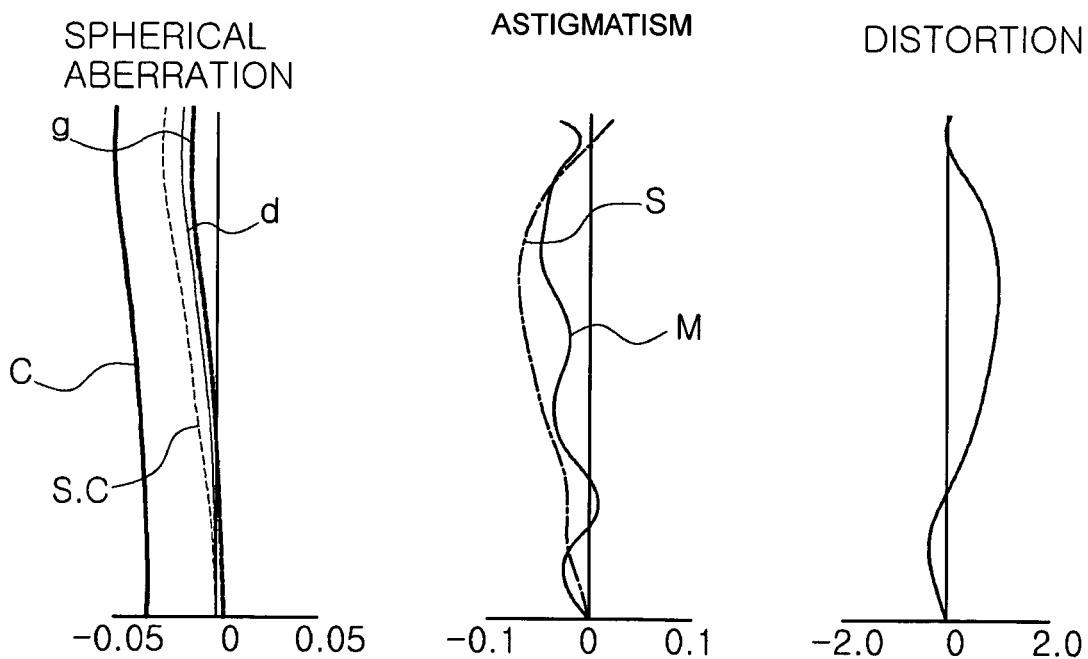
FIGS. 8A to 8C are graphs illustrating aberrations of the optical system shown in FIG. 7.

FIG. 7 is a view illustrating a lens arrangement of the high-definition imaging optical system according to the fourth embodiment of the invention, and FIGS. 8A to 8C show aberrations of the embodiment shown in Table 7 and FIG. 7.

In the fourth embodiment, an effective focal length f is 5.700 mm, an F number Fno is 2.8, an angle of view $2\omega$ is 64 degrees, a total length TL from an object-side surface of the first lens group to the image plane is 6.80 mm.

A focal length f1 of the first lens L1 is 3.430 mm, a combined focal length of the second and third lenses L2 and L3, i.e., a focal length of the second lens group designated with f23 is −4.851 mm, a focal length f4 of the fourth lens L4 is 2.714 mm and a focal length f5 of the fifth lens L5 is −2.545 mm.

TABLE 7

| Surface No. | Radius of curvature (R) | Thickness or distance (t) | Refractive index ($N_d$) | Abbe number ($V_d$) | Remark |
|---|---|---|---|---|---|
| *1 | 2.758 | 0.750 | 1.589 | 61.3 | First lens |
| *2 | −6.796 | 0.060 | | | |
| 3 | −9.052 | 0.750 | 1.697 | 55.5 | Second lens |
| 4 | −3.981 | 0.350 | 1.620 | 36.3 | Third lens |
| 5 | 4.351 | 1.170 | | | |
| *6 | −12.985 | 0.950 | 1.530 | 55.8 | Fourth lens |
| *7 | −1.328 | 0.200 | | | |
| *8 | −4.568 | 0.700 | 1.530 | 55.8 | Fifth lens |
| *9 | 2.094 | 1.000 | | | |
| 10 | ∞ | 0.145 | 1.5168 | 64.2 | Optical filter |
| 11 | ∞ | 0.760 | | | |
| 12 | ∞ | 0.000 | | | Image plane |

In Table 7, * represents an aspherical surface, and values of conic coefficient K and aspherical coefficients A, B, C, D, E and F in the fourth embodiment according to Equation 1 are noted in Table 8 below.

TABLE 8

| Surface No. | K | A | B | C |
|---|---|---|---|---|
| 1 | −0.59961184E+00 | 0.17824283E−02 | −0.33132285E−02 | 0.31850743E−02 |
| 2 | −0.53382482E+01 | 0.19977945E−02 | −0.59387059E−02 | 0.46033869E−02 |
| 6 | 0.15407440E−32 | −0.76656104E−02 | −0.10465105E−01 | −0.18961264E−03 |
| 7 | −0.58863160E+01 | −.74011643E−01 | 0.26384713E−01 | −0.68255212E−02 |
| 8 | −0.14429632E+03 | 0.60876452E−01 | 0.61592649E−02 | 0.50430869E−02 |
| 9 | −0.92494564E+01 | −0.38318567E−01 | 0.78734768E−02 | 0−.11052372E−02 |

| Surface No. | D | E | F |
|---|---|---|---|
| 1 | −0.23749647E−02 | | |
| 2 | −.29632341E−02 | | |
| 6 | 0.39053001E−03 | −0.10396932E−03 | |
| 7 | 0.73167303E−04 | 0.25495449E−03 | |
| 8 | −0.19173221E−02 | 0.27245119E−03 | −.14019513E−04 |
| 9 | 0.73253688E−04 | −0.21640358E−05 | |

Fifth Embodiment

Following Table 9 shows numeric values of the lens system according to a fifth embodiment of the present invention.

Figure 9:
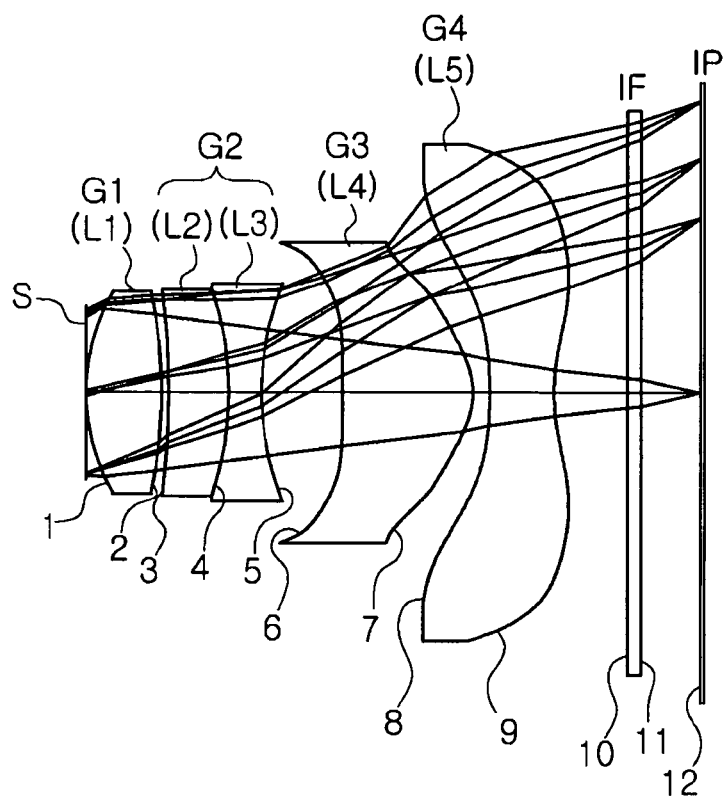
FIG. 9 is a lens configuration view illustrating a high-definition imaging optical system according to a fifth embodiment of the invention.
Figures 10A, 10B, 10C:
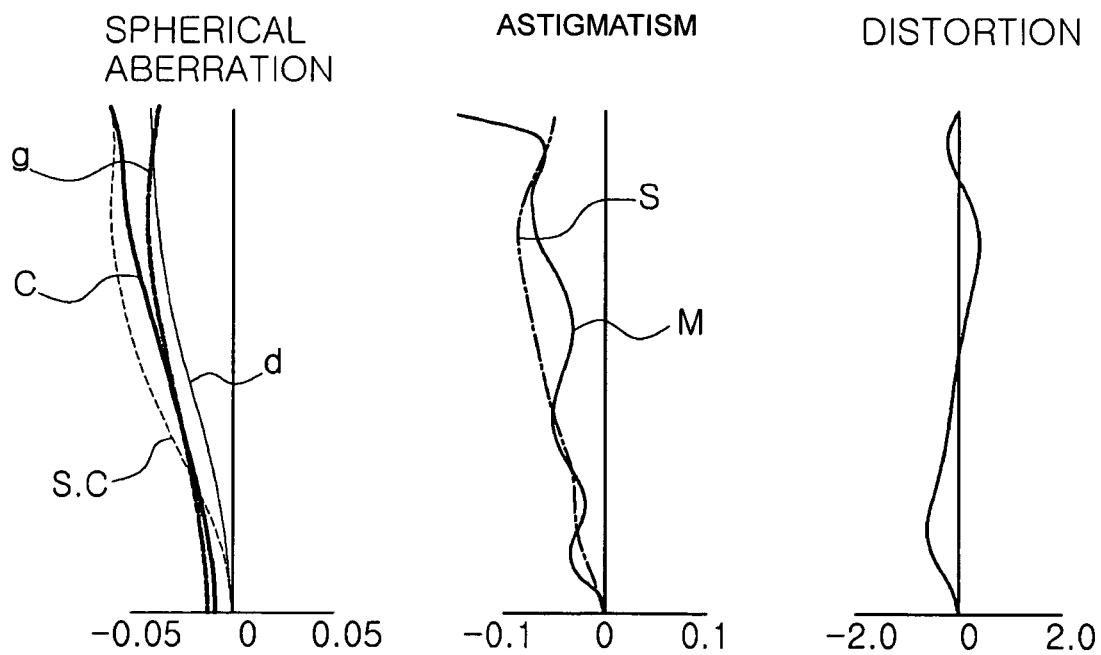
FIGS. 10A to 10C are graphs illustrating aberrations of the optical system shown in FIG. 9.

FIG. 9 is a view illustrating a lens arrangement of the high-definition imaging optical system according to the fifth embodiment of the invention, and FIGS. 10A to 10C show aberrations of the embodiment shown in Table 9 and FIG. 9.

In the fifth embodiment, an effective focal length f is 5.706 mm, an F number Fno is 2.6, an angle of view $2\omega$ is 64 degrees, a total length TL from an object-side surface of the first lens group to the image plane is 7.15 mm.

A focal length f1 of the first lens L1 is 3.551 mm, a combined focal length of the second and third lenses L2 and L3, i.e., a focal length of the second lens group designated with f23 is −5.332 mm, a focal length f4 of the fourth lens L4 is 2.311 mm and a focal length f5 of the fifth lens L5 is −2.195 mm.

TABLE 9

| Surface No. | Radius of curvature (R) | Thickness or distance (t) | Refractive index ($N_d$) | Abbe number ($V_d$) | Remark |
|---|---|---|---|---|---|
| *1 | 20775.000 | 1.020 | 1.583 | 59.5 | First lens |
| *2 | −7.055 | 0.060 | | | |
| 3 | −7.537 | 0.750 | 1.697 | 55.5 | Second lens |
| 4 | −2.637 | 0.400 | 1.620 | 36.3 | Third lens |
| 5 | 5.223 | 0.810 | | | |
| *6 | −6.265 | 1.380 | 1.530 | 55.8 | Fourth lens |
| *7 | −1.103 | 0.120 | | | |
| *8 | −5.402 | 0.700 | 1.530 | 55.8 | Fifth lens |
| *9 | 1.549 | 1.000 | | | |
| 10 | ∞ | 0.145 | 1.5168 | 64.2 | Optical filter |
| 11 | ∞ | 0.810 | | | |
| 12 | ∞ | 0.000 | | | Image plane |

In Table 9, * represents an aspherical surface, and values of conic coefficient K and aspherical coefficients A, B, C, D, E and F in the fifth embodiment according to Equation 1 are noted in Table 10 below.

TABLE 10

| Surface No. | K | A | B | C |
|---|---|---|---|---|
| 1 | −0.10359600E+01 | 0.53229496E−02 | 0.19166771E−02 | −0.97980322E−03 |
| 2 | −0.55041318E+01 | 0.34946599E−02 | 0.10380290E−02 | −0.86229136E−03 |
| 6 | −0.49743958E+01 | −0.14258804E−01 | −0.14798477E−01 | 0.67920925E−02 |
| 7 | −0.44853754E+01 | −0.67417661E−01 | 0.22872838E−01 | −0.55018030E−02 |
| 8 | −0.19163882E+03 | −0.49417097E−01 | 0.63297586E−02 | 0.42903487E−02 |
| 9 | −0.89035309E+01 | −0.35929450E−01 | 0.78155339E−02 | −0.11374181E−02 |

| Surface No. | D | E | F |
|---|---|---|---|
| 1 | 0.16763071E−03 | | |
| 2 | 0.66053518E−04 | | |
| 6 | −0.11580545E−02 | 0.58503004E−04 | |
| 7 | 0.84044550E−03 | 0.14128543E−04 | |
| 8 | −0.19043677E−02 | 0.29275318E−03 | −0.15682290E−04 |
| 9 | 0.76623524E−04 | −0.21378064E−05 | |

Sixth Embodiment

Following Table 11 shows numeric values of the lens system according to a sixth embodiment of the present invention.

Figure 11:
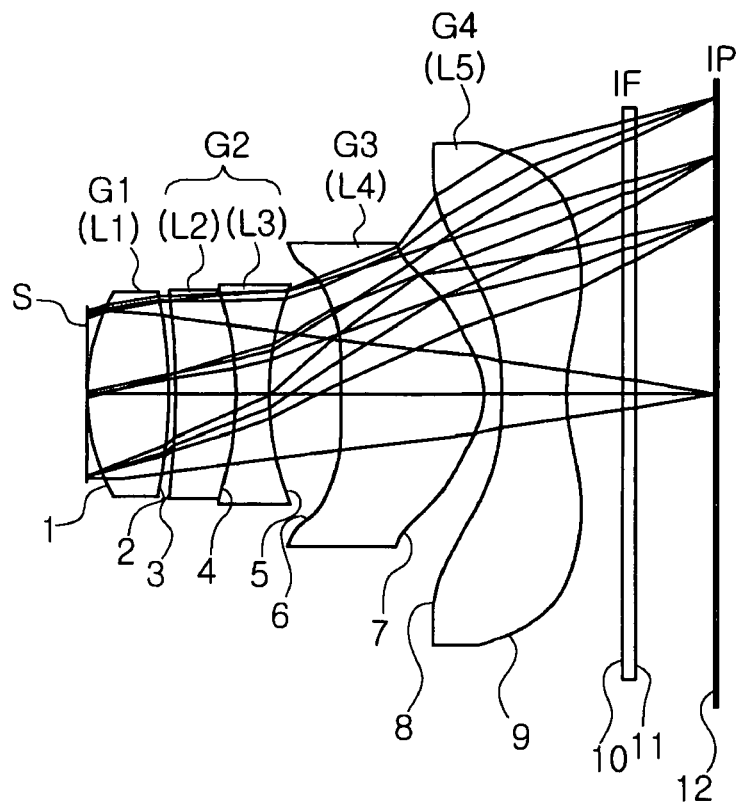
FIG. 11 is a lens configuration view illustrating a high-definition imaging optical system according to a sixth embodiment of the invention.
Figure 12A:
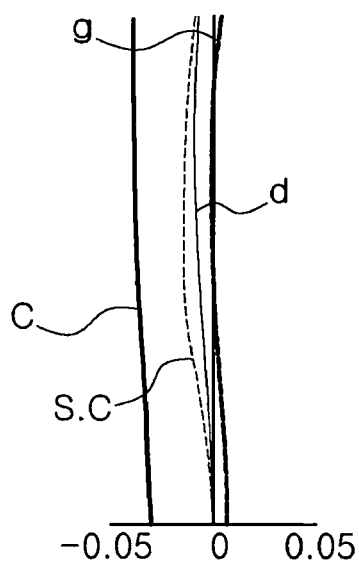
FIGS. 12A to 12C are graphs illustrating aberrations of the optical system shown in FIG. 11.
Figure 12B:
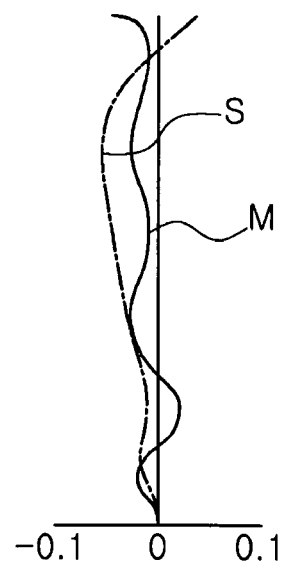
Figure 12C:
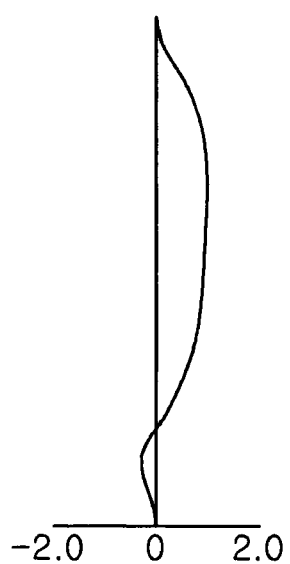

FIG. 11 is a view illustrating a lens arrangement of the high-definition imaging optical system according to the sixth embodiment of the invention, and FIGS. 12A to 12C show aberrations of the embodiment shown in Table 11 and FIG. 11.

In the sixth embodiment, an effective focal length f is 5.691 mm, an F number Fno is 2.6, an angle of view 2ω is 64 degrees, a total length TL from an object-side surface of the first lens group to the image plane is 7.15 mm.

A focal length f1 of the first lens L1 is 3.586 mm, a combined focal length of the second and third lenses L2 and L3, i.e., a focal length of the second lens group designated with f23 is −5.274 mm, a focal length f4 of the fourth lens L4 is 2.697 mm and a focal length f5 of the fifth lens L5 is −2.608 mm.

TABLE 11

| Surface No. | Radius of curvature (R) | Thickness or distance (t) | Refractive index ($N_d$) | Abbe number ($V_d$) | Remark |
|---|---|---|---|---|---|
| *1 | 2.734 | 0.960 | 1.589 | 61.3 | First lens |
| *2 | −8.086 | 0.060 | | | |
| 3 | −9.253 | 0.750 | 1.697 | 55.5 | Second lens |
| 4 | −2.846 | 0.400 | 1.620 | 36.3 | Third lens |
| 5 | 4.557 | 0.790 | | | |
| *6 | −7.508 | 1.430 | 1.530 | 55.8 | Fourth lens |
| *7 | −1.280 | 0.160 | | | |
| *8 | −6.764 | 0.760 | 1.530 | 55.8 | Fifth lens |
| *9 | 1.867 | 0.800 | | | |
| 10 | ∞ | 0.145 | 1.5168 | 64.2 | Optical filter |
| 11 | ∞ | 0.910 | | | |
| 12 | ∞ | 0.000 | | | Image plane |

In Table 11, * represents an aspherical surface, and values of conic coefficient K and aspherical coefficients A, B, C, D, E and F in the sixth embodiment according to Equation 1 are noted in Table 12 below.

TABLE 12

| Surface No. | K | A | B | C |
|---|---|---|---|---|
| 1 | −0.12862340E+01 | 0.78517506E−02 | 0.56456087E−03 | 0.26820642E−03 |
| 2 | −0.69878697E+01 | 0.45546022E−02 | −0.31386011E−03 | 0.46072365E−03 |
| 6 | 0.38596806E+01 | −0.13942813E−01 | −0.13231291E−01 | 0.11299555E−02 |
| 7 | −0.52943621E+01 | −0.89515553E−01 | 0.32519251E−01 | −0.89786600E−02 |
| 8 | −0.37187197E+03 | −0.62147709E−01 | 0.48324851E−02 | 0.57551194E−02 |
| 9 | −0.80512978E+01 | −0.38731587E−01 | 0.77806926E−02 | −0.99787672E−03 |

| Surface No. | D | E | F |
|---|---|---|---|
| 1 | −0.15936357E−03 | | |
| 2 | −0.27157090E−03 | | |
| 6 | 0.64665657E−03 | −0.38279133E−04 | |
| 7 | 0.98998702E−03 | 0.93457235E−04 | |
| 8 | −0.20578830E−02 | −0.28215679E−03 | −0.14050869E−04 |
| 9 | 0.60369991E−04 | −0.15517768E−05 | |

Seventh Embodiment

Following table 13 shows numeric values of the lens system according to a seventh embodiment of the present invention.

Figure 13:
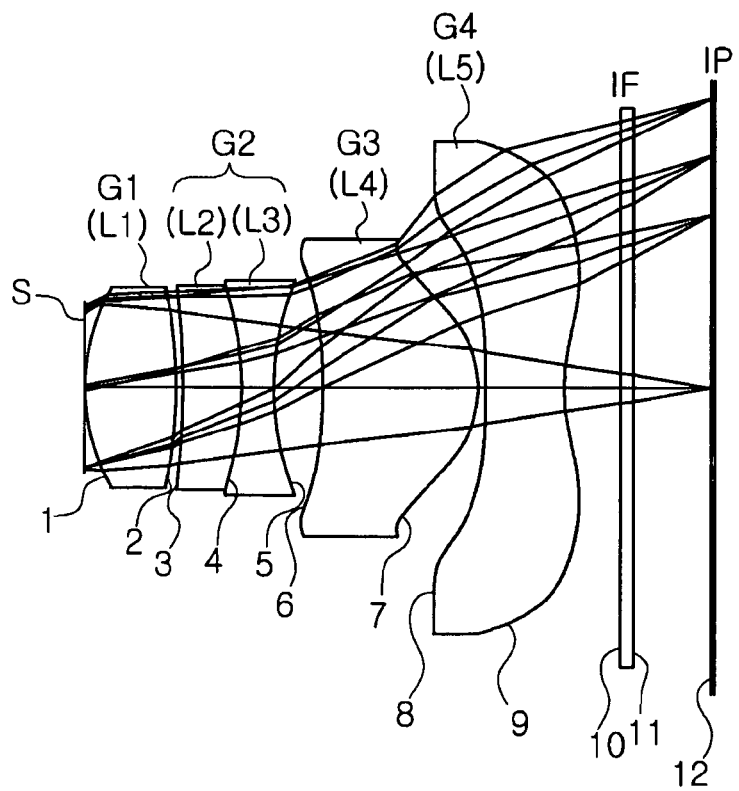
FIG. 13 is a lens configuration view illustrating a high-definition imaging optical system according to a seventh embodiment of the invention.
Figures 14A, 14B, 14C:
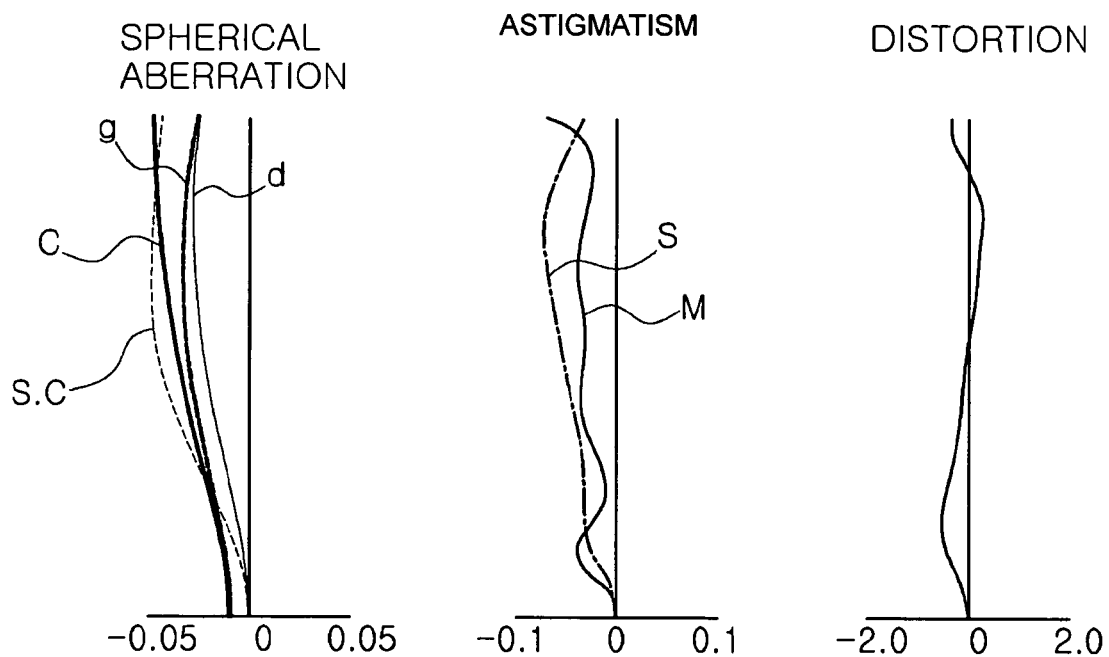
FIGS. 14A to 14C are graphs illustrating aberrations of the optical system shown in FIG. 13.

FIG. 13 is a view illustrating a lens arrangement of the high-definition imaging optical system according to the seventh embodiment of the invention, and FIGS. 14A to 14C show aberrations of the embodiment shown in Table 13 and FIG. 13.

In the seventh embodiment, an effective focal length f is 5.698 mm, an F number Fno is 2.6, an angle of view $2\omega$ is 64 degrees, a total length TL from an object-side surface of the first lens group to the image plane is 7.58 mm.

A focal length f1 of the first lens L1 is 4.434 mm, a combined focal length of the second and third lenses L2 and L3, i.e., a focal length of the second lens group designated with f23 is −7.478 mm, a focal length f4 of the fourth lens L4 is 2.652 mm and a focal length f5 of the fifth lens L5 is −2.599 mm.

TABLE 13

| Surface No. | Radius of curvature (R) | Thickness or distance (t) | Refractive index ($N_d$) | Abbe number ($V_d$) | Remark |
|---|---|---|---|---|---|
| *1  | 3.504    | 1.310 | 1.583  | 59.5 | First lens |
| *2  | −8.515   | 0.060 |        |      |            |
| 3   | −970.480 | 0.750 | 1.697  | 55.5 | Second lens |
| 4   | −3.286   | 0.400 | 1.626  | 35.7 | Third lens |
| 5   | 4.029    | 0.590 |        |      |            |
| *6  | −6.189   | 1.500 | 1.530  | 55.8 | Fourth lens |
| *7  | −1.242   | 0.100 |        |      |            |
| *8  | −6.700   | 1.020 | 1.530  | 55.8 | Fifth lens |
| *9  | 1.825    | 1.000 |        |      |            |
| 10  | ∞        | 0.145 | 1.5168 | 64.2 | Optical filter |
| 11  | ∞        | 0.740 |        |      |            |
| 12  | ∞        | 0.000 |        |      | Image plane |

In Table 13, * represents an aspherical surface, and values of conic coefficient K and aspherical coefficients A, B, C, D, E and F in the seventh embodiment according to Equation 1 are noted in Table 14 below.

TABLE 14

| Surface No. | K | A | B | C |
|---|---|---|---|---|
| 1 | −0.14045497E+01 | 0.84451792E−03 | −0.42054495E−03 | 0.57493990E−04 |
| 2 | −0.21786858E+01 | 0.26788989E−02 | −0.33057560E−03 | −0.22496520E−04 |
| 6 | −0.57449311E+01 | −0.55557284E−02 | −0.39961728E−02 | 0.23856754E−02 |
| 7 | −0.43589901E+01 | −0.66061728E−01 | 0.24625322E−01 | −0.55145594E−02 |
| 8 | −0.27630058E+03 | −0.38168355E−01 | 0.20033801E−02 | 0.45665379E−02 |
| 9 | −0.80532088E+01 | −0.28782443E−01 | 0.55680728E−02 | −0.76609817E−03 |

| Surface No. | D | E | F |
|---|---|---|---|
| 1 | −0.15115517E−03 | | |
| 2 | −0.12208045E−03 | | |
| 6 | 0.37877860E−03 | −0.11866362E−03 | |
| 7 | 0.68396704E−03 | 0.36316273E−04 | |
| 8 | −0.18587805E−02 | 0.29309567E−03 | −0.16259895E−04 |
| 9 | 0.49680791E−04 | −0.13306263E−05 | |

Eighth Embodiment

Following table 15 shows numeric values of the lens system according to a seventh embodiment of the present invention.

Figure 15:
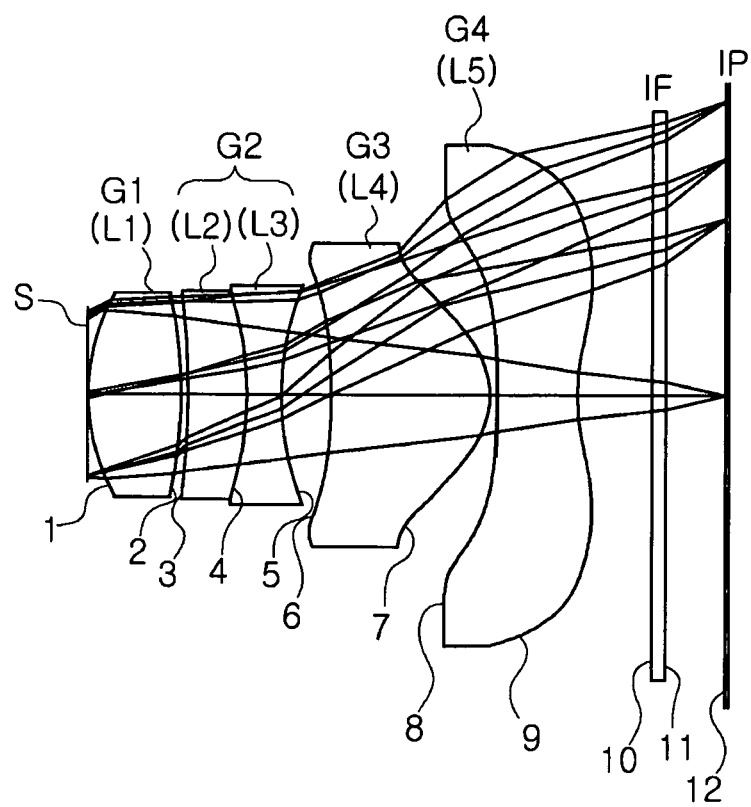
FIG. 15 is a lens configuration view illustrating a high-definition imaging optical system according to an eighth embodiment of the invention.
Figures 16A, 16B, 16C:
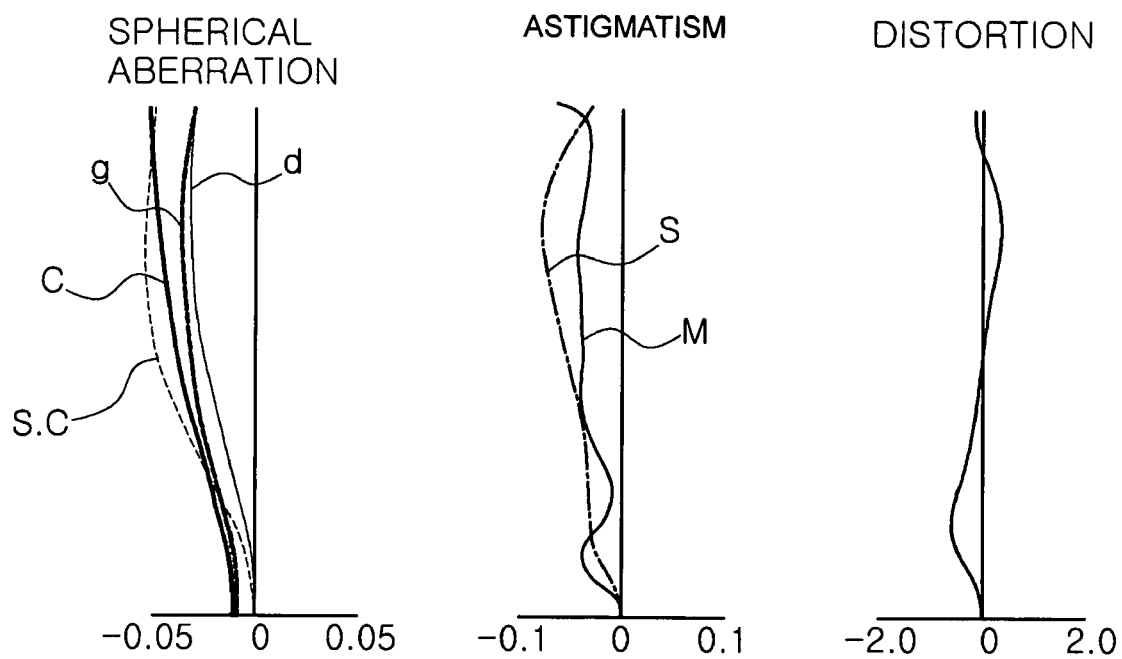
FIGS. 16A to 16C are graphs illustrating aberrations of the optical system shown in FIG. 15.

FIG. 15 is a view illustrating a lens arrangement of the high-definition imaging optical system according to the eighth embodiment of the invention, and FIGS. 16A to 16C show aberrations of the embodiment shown in Table 15 and FIG. 15.

In the eighth embodiment, an effective focal length f is 5.702 mm, an F number Fno is 2.6, an angle of view $2\omega$ is 64 degrees, a total length TL from an object-side surface of the first lens group to the image plane is 7.58 mm.

A focal length f1 of the first lens L1 is 4.460 mm, a combined focal length of the second and third lenses L2 and L3, i.e., a focal length of the second lens group designated with f23 is −7.334 mm, a focal length f4 of the fourth lens L4 is 2.612 mm and a focal length f5 of the fifth lens L5 is −2.554 mm.

TABLE 15

| Surface No. | Radius of curvature (R) | Thickness or distance (t) | Refractive index ($N_d$) | Abbe number ($V_d$) | Remark |
|---|---|---|---|---|---|
| *1  | 3.703   | 1.370 | 1.589  | 61.3 | First lens |
| *2  | −7.804  | 0.060 |        |      |            |
| 3   | 64.504  | 0.750 | 1.697  | 55.5 | Second lens |
| 4   | −3.485  | 0.400 | 1.620  | 36.3 | Third lens |
| 5   | 3.620   | 0.600 |        |      |            |
| *6  | −7.003  | 1.500 | 1.530  | 55.8 | Fourth lens |
| *7  | −1.242  | 0.100 |        |      |            |
| *8  | −6.511  | 0.980 | 1.530  | 55.8 | Fifth lens |
| *9  | 1.798   | 1.000 |        |      |            |
| 10  | ∞       | 0.145 | 1.5168 | 64.2 | Optical filter |
| 11  | ∞       | 0.710 |        |      |            |
| 12  | ∞       | 0.000 |        |      | Image plane |

In Table 15, * represents an aspherical surface, and values of conic coefficient K and aspherical coefficients A, B, C, D, E and F in the eighth embodiment according to Equation 1 are noted in Table 16 below.

TABLE 16

| Surface No. | K | A | B | C |
|---|---|---|---|---|
| 1 | −0.10626983E+01 | −0.14143302E−02 | −0.79564963E−03 | 0.17979544E−03 |
| 2 | 0.10000000E+01 | 0.21751188E−02 | −0.39999603E−03 | −0.27002470E−03 |
| 6 | −0.66050264E+01 | −0.25578106E−02 | −0.40410798E−02 | 0.19372969E−02 |
| 7 | −0.45394446E+01 | −0.63214397E−01 | 0.23311673E−01 | −0.50095158E−02 |
| 8 | −0.27191894E+03 | −0.37552901E−01 | 0.12475464E−02 | 0.46768280E−02 |
| 9 | −0.82808962E+0 | −0.28208067E−01 | 0.51888056E−02 | −0.68025761E−03 |

| Surface No. | D | E | F |
|---|---|---|---|
| 1 | −0.20075521E−03 | | |
| 2 | −0.64288250E−04 | | |
| 6 | 0.23930260E−03 | −0.67231162E−04 | |
| 7 | 0.49383404E−03 | 0.53264947E−04 | |
| 8 | −0.18439892E−02 | 0.29217581E−03 | −0.16536885E−04 |
| 9 | 0.40983790E−04 | −0.97971673E−08 | |

Ninth Embodiment

Following table 17 shows numeric values of the lens system according to a ninth embodiment of the present invention.

Figure 17:
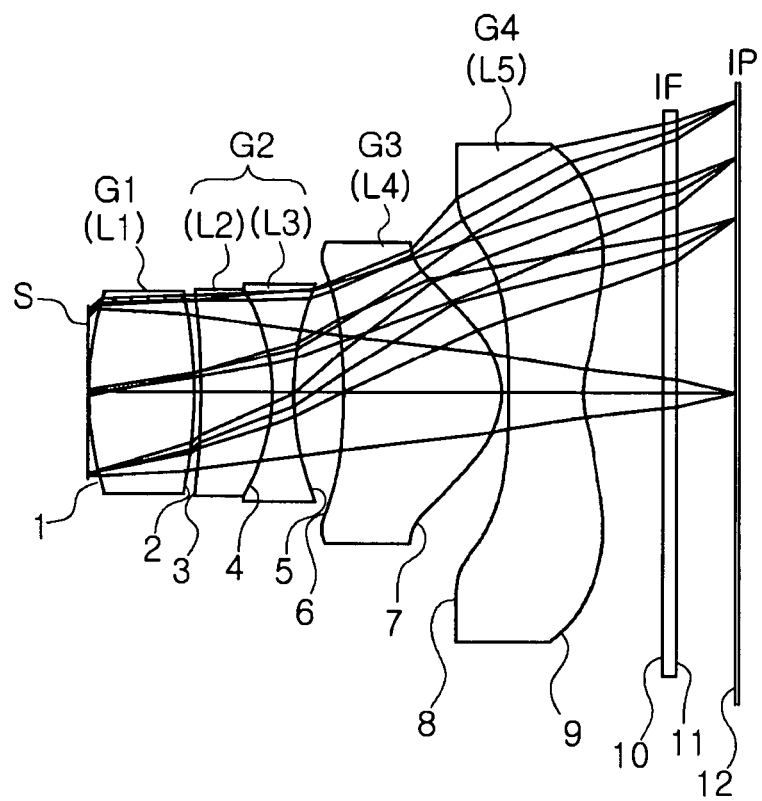
FIG. 17 is a lens configuration view illustrating a high-definition imaging optical system according to a ninth embodiment of the invention.
Figure 18A:
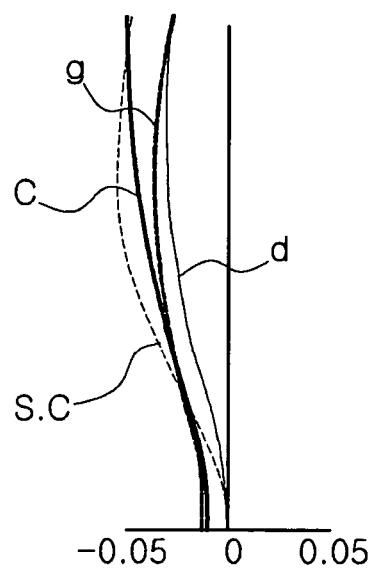
FIGS. 18A to 18C are graphs illustrating aberrations of the optical system shown in FIG. 17.
Figure 18B:
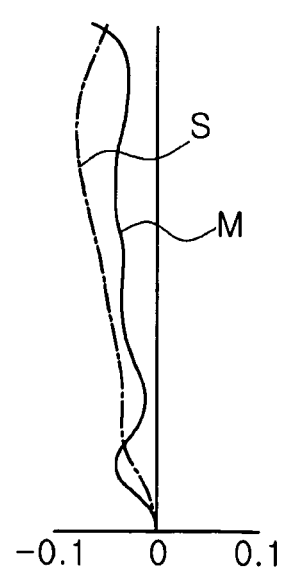
Figure 18C:
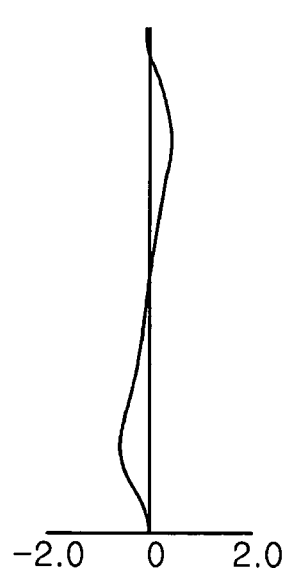

FIG. 17 is a view illustrating a lens arrangement of the high-definition imaging optical system according to the ninth embodiment of the invention, and FIGS. 18A to 18C show aberrations of the embodiment shown in Table 17 and FIG. 17.

In the ninth embodiment, an effective focal length f is 5.701 mm, an F number Fno is 2.6, an angle of view 2ω is 64 degrees, a total length TL from an object-side surface of the first lens group to the image plane is 7.92 mm.

A focal length f1 of the first lens L1 is 4.972 mm, a combined focal length of the second and third lenses L2 and L3, i.e., a focal length of the second lens group designated with f23 is −9.728 mm, a focal length f4 of the fourth lens L4 is 2.706 mm and a focal length f5 of the fifth lens L5 is −2.624 mm.

TABLE 17

| Surface No. | Radius of curvature (R) | Thickness or distance (t) | Refractive index ($N_d$) | Abbe number ($V_d$) | Remark |
|---|---|---|---|---|---|
| *1 | 4.592 | 1.400 | 1.583 | 59.5 | First lens |
| *2 | −6.984 | 0.060 | | | |
| 3 | 49.772 | 1.070 | 1.694 | 53.5 | Second lens |
| 4 | −2.547 | 0.400 | 1.613 | 37.0 | Third lens |
| 5 | 4.056 | 0.520 | | | |
| *6 | −6.890 | 1.500 | 1.530 | 55.8 | Fourth lens |
| *7 | −1.277 | 0.100 | | | |
| *8 | −6.680 | 1.040 | 1.530 | 55.8 | Fifth lens |
| *9 | 1.850 | 1.000 | | | |
| 10 | ∞ | 0.145 | 1.5168 | 64.2 | Optical filter |
| 11 | ∞ | 0.710 | | | |
| 12 | ∞ | 0.000 | | | Image plane |

In Table 17, * represents an aspherical surface, and values of conic coefficient K and aspherical coefficients A, B, C, D, E and F in the ninth embodiment according to Equation 1 are noted in Table 18 below.

TABLE 18

| Surface No. | K | A | B | C |
|---|---|---|---|---|
| 1 | −0.20385760E+01 | −0.25813393E−02 | −0.74665209E−03 | 0.17674786E−05 |
| 2 | 0.72967817E+00 | 0.62734922E−03 | −0.21421181E−03 | 0.31819697E−04 |
| 6 | −0.70984056E+01 | −0.30631358E−02 | −0.25361690E−02 | 0.19529769E−02 |
| 7 | −0.45495943E+01 | −0.65101600E−01 | 0.25011460E−01 | −0.56553461E−02 |
| 8 | −0.27818367E+03 | −0.38866075E−01 | 0.19110807E−02 | 0.45837171E−02 |
| 9 | −0.78674957E+0 | −0.27643684E−01 | 0.53197145E−02 | −0.72554463E−03 |

| Surface No. | D | E | F |
|---|---|---|---|
| 1 | −0.80524103E−04 | | |
| 2 | −0.50042820E−04 | | |
| 6 | 0.50037594E−03 | −0.13588134E−03 | |
| 7 | 0.74189665E−03 | 0.26380166E−04 | |
| 8 | −0.18574757E−02 | 0.29333257E−03 | −0.16189650E−04 |
| 9 | 0.47713893E−04 | −0.13241152E−05 | |

Tenth Embodiment

Following table 19 shows numeric values of the lens system according to a tenth embodiment of the present invention.

Figure 19:
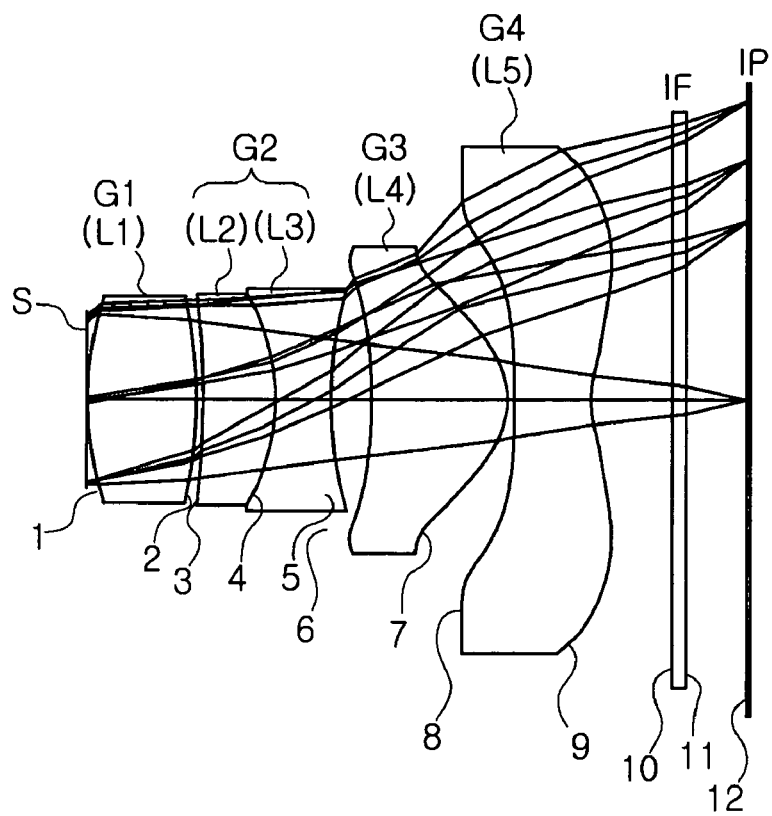
FIG. 19 is a lens configuration view illustrating a high-definition imaging optical system according to a tenth embodiment of the invention.
Figure 20A:
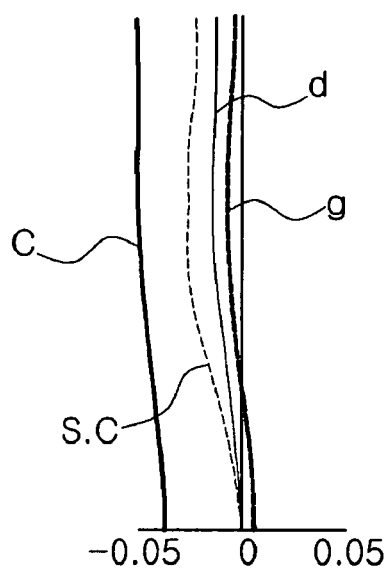
FIGS. 20A to 20C are graphs illustrating aberrations of the optical system shown in FIG. 19.
Figure 20B:
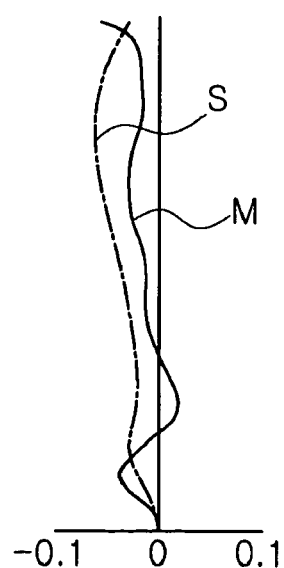
Figure 20C:
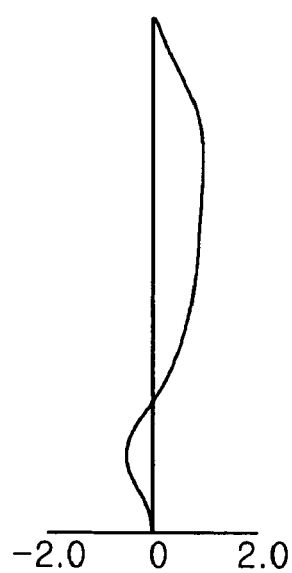

FIG. 20 is a view illustrating a lens arrangement of the high-definition imaging optical system according to the tenth embodiment of the invention, and FIGS. 20A to 20C show aberrations of the embodiment shown in Table 19 and FIG. 19.

In the tenth embodiment, an effective focal length f is 5.698 mm, an F number Fno is 2.6, an angle of view 2ω is 64 degrees, a total length TL from an object-side surface of the first lens group to the image plane is 7.94 mm.

A focal length f1 of the first lens L1 is 4.606 mm, a combined focal length of the second and third lenses L2 and L3, i.e., a focal length of the second lens group designated with f23 is −7.395 mm, a focal length f4 of the fourth lens group L4 is 2.504 mm and a focal length f5 of the fifth lens group L5 is −2.443 mm.

TABLE 19

| Surface No. | Radius of curvature (R) | Thickness or distance (t) | Refractive index ($N_d$) | Abbe number ($V_d$) | Remark |
|---|---|---|---|---|---|
| *1  | 4.658   | 1.400 | 1.583  | 59.5 | First lens |
| *2  | −5.642  | 0.060 |        |      |            |
| 3   | −77.820 | 1.050 | 1.697  | 55.5 | Second lens |
| 4   | −3.066  | 0.580 | 1.620  | 36.3 | Third lens |
| 5   | 4.093   | 0.510 |        |      |            |
| *6  | −9.292  | 1.500 | 1.530  | 55.8 | Fourth lens |
| *7  | −1.226  | 0.100 |        |      |            |
| *8  | −6.536  | 0.920 | 1.544  | 56.0 | Fifth lens |
| *9  | 1.752   | 1.000 |        |      |            |
| 10  | ∞       | 0.145 | 1.5168 | 64.2 | Optical filter |
| 11  | ∞       | 0.700 |        |      |            |
| 12  | ∞       | 0.000 |        |      | Image plane |

In Table 19, * represents an aspherical surface, and values of conic coefficient K and aspherical coefficients A, B, C, D, E and F in the tenth embodiment according to Equation 1 are noted in Table 20 below.

TABLE 20

| Surface No. | K | A | B | C |
|---|---|---|---|---|
| 1 | −0.21837373E+0  | −0.34599332E−02 | −0.92030773E−03 | −0.43287816E−03 |
| 2 | 0.17727113E+01  | 0.41786073E−03  | −0.70292578E−03 | −0.97292662E−04 |
| 6 | −0.72658820E+01 | −0.68887015E−02 | 0.13186040E−02  | −0.17219797E−02 |
| 7 | −0.47012515E+01 | −0.71574614E−01 | 0.28612791E−01  | −0.69651667E−02 |
| 8 | −0.32150306E+03 | −0.43283651E−01 | 0.24446464E−02  | 0.46631480E−02  |
| 9 | −0.75054482E+01 | −0.29501822E−01 | 0.54686216E−02  | −0.69626921E−03 |

| Surface No. | D | E | F |
|---|---|---|---|
| 1 | 0.68456761E−04  |                 |                 |
| 2 | −0.32420736E−04 |                 |                 |
| 6 | 0.14899909E−02  | −0.20943800E−03 |                 |
| 7 | 0.80293395E−03  | 0.45481481E−04  |                 |
| 8 | −0.18592828E−02 | 0.29223668E−03  | −0.16353144E−04 |
| 9 | 0.41786279E−04  | −0.10303821E−05 |                 |

Eleventh Embodiment

Following table 21 shows numeric values of the lens system according to an eleventh embodiment of the present invention.

Figure 22A:
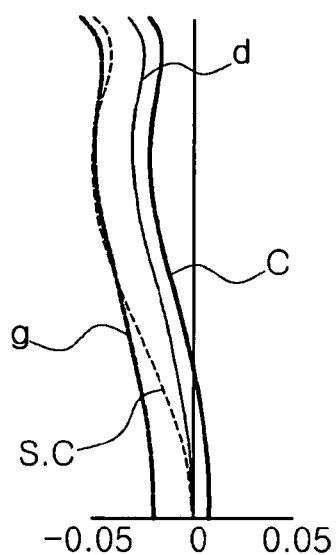
FIGS. 22A to 22C are graphs illustrating aberrations of the optical system shown in FIG. 21.
Figure 22B:
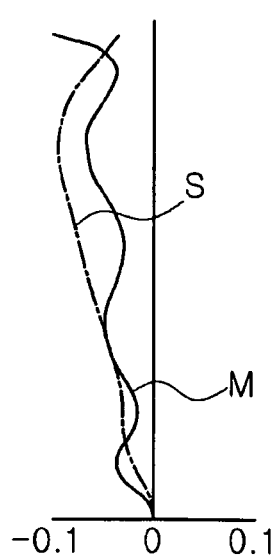
Figure 22C:
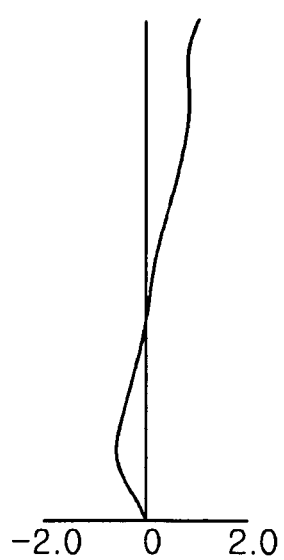

FIG. 21 is a view illustrating a lens arrangement of the high-definition imaging optical system according to the eleventh embodiment of the invention, and FIGS. 22A to 22C show aberrations of the embodiment shown in Table 21 and FIG. 21.

In the eleventh embodiment, an effective focal length f is 5.703 mm, an F number Fno is 2.6, an angle of view 2ω is 64 degrees, a total length TL from an object-side surface of the first lens group to the image plane is 7.20 mm.

A focal length f1 of the first lens L1 is 3.849 mm, a combined focal length of the second and third lenses L2 and L3, i.e., a focal length of the second lens group designated with f23 is −5.925 mm, a focal length f4 of the fourth lens L4 is 2.272 mm and a focal length f5 of the fifth lens L5 is −2.202 mm.

TABLE 21

| Surface No. | Radius of curvature (R) | Thickness or distance (t) | Refractive index ($N_d$) | Abbe number ($V_d$) | Remark |
|---|---|---|---|---|---|
| *1  | 2.869  | 0.920 | 1.583 | 59.5 | First lens |
| *2  | −9.091 | 0.060 |       |      |            |
| 3   | −9.342 | 0.750 | 1.697 | 55.5 | Second lens |
| 4   | −2.730 | 0.050 |       |      |            |
| 5   | −2.873 | 0.400 | 1.620 | 36.3 | Third lens |
| 6   | 4.668  | 0.780 |       |      |            |
| *7  | −7.561 | 1.500 | 1.530 | 55.8 | Fourth lens |
| *8  | −1.110 | 0.100 |       |      |            |
| *9  | −5.485 | 0.710 | 1.530 | 55.8 | Fifth lens |
| *10 | 1.752  | 1.000 |       |      |            |
| 11  | ∞      | 0.145 | 1.517 | 64.2 | Optical filter |
| 12  | ∞      | 0.820 |       |      |            |
| 13  | ∞      |       |       |      | Image plane |

In Table 21, * represents an aspherical surface, and values of conic coefficient K and aspherical coefficients A, B, C, D, E and F in the eleventh embodiment according to Equation 1 are noted in Table 22 below.

TABLE 22

| Surface No. | K | A | B | C |
|---|---|---|---|---|
| 1 | −0.1584535E+01 | 0.60578787E−02 | 0.18965087E−02 | −0.23017901E−02 |
| 2 | −0.98999996E+01 | 0.51182152E−02 | 0.94095039E−03 | −0.14835687E−02 |
| 7 | −0.5523408E+01 | −0.88448753E−02 | −0.1148150E−01 | 0.60181155E−02 |
| 8 | −0.4547009E+01 | −0.65437303E−01 | 0.23478683E−01 | −0.54268432E−02 |
| 9 | −0.19005112E+03 | −0.5330338E−01 | 0.70407834E−02 | 0.42462337E−02 |
| 10 | −0.9059416E+01 | −0.37880182E−01 | 0.83762601E−02 | −0.12302676E−02 |

| Surface No. | D | E | F |
|---|---|---|---|
| 1 | −.2254383E−04 | | |
| 2 | −0.33577188E−03 | | |
| 7 | −0.1134092E−02 | 0.457943803E−04 | |
| 8 | 0.81885266E−03 | −0.60007739E−05 | |
| 9 | −0.19017804E−02 | 0.29372666E−03 | −0.1585135E−04 |
| 10 | 0.88202429E−04 | −0.27428801E−05 | |

Twelfth Embodiment

Following table 23 shows numeric values of the lens system according to a twelfth embodiment of the present invention.

Figures 24A, 24B, 24C:
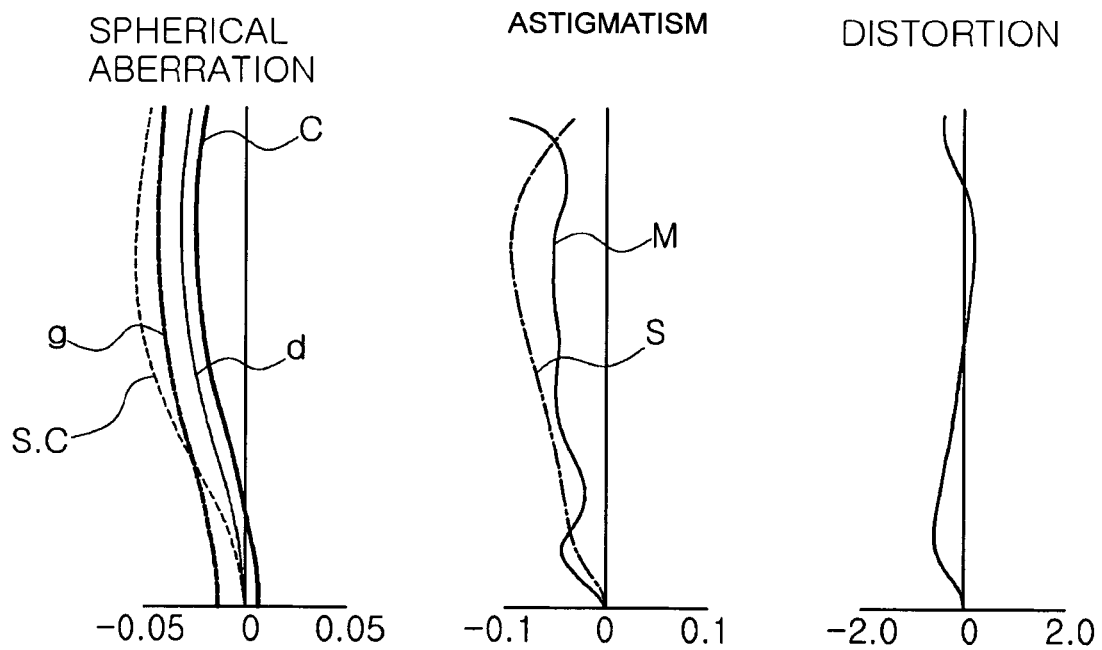
FIGS. 24A to 24C are graphs illustrating aberrations of the optical system shown in FIG. 23.

FIG. 23 is a view illustrating a lens arrangement of the high-definition imaging optical system according to the twelfth embodiment of the invention, and FIGS. 24A to 24C show aberrations of the embodiment shown in Table 23 and FIG. 23.

In the twelfth embodiment, an effective focal length f is 5.703 mm, an F number Fno is 2.6, an angle of view 2ω is 64 degrees, a total length TL from an object-side surface of the first lens group to the image plane is 7.57 mm.

A focal length f1 of the first lens L1 is 4.570 mm, a combined focal length of the second and third lenses L2 and L3, i.e., a focal length of the second lens group designated with f23 is −7.384 mm, a focal length f4 of the fourth lens group L4 is 2.713 mm and a focal length f5 of the fifth lens group L5 is −2.730 mm.

TABLE 23

| Surface No. | Radius of curvature (R) | Thickness or distance (t) | Refractive index ($N_d$) | Abbe number ($V_d$) | Remark |
|---|---|---|---|---|---|
| *1 | 3.588 | 1.160 | 1.583 | 59.5 | First lens |
| *2 | −9.332 | 0.060 | | | |
| 3 | −59.298 | 0.740 | 1.697 | 55.5 | Second lens |
| 4 | −3.022 | 0.050 | | | |
| 5 | −3.023 | 0.520 | 1.626 | 35.7 | Third lens |
| 6 | 4.141 | 0.550 | | | |
| *7 | −8.142 | 1.500 | 1.530 | 55.8 | Fourth lens |
| *8 | −1.300 | 0.100 | | | |
| *9 | −6.713 | 1.040 | 1.530 | 55.8 | Fifth lens |
| *10 | 1.943 | 1.000 | | | |
| 11 | ∞ | 0.145 | 1.517 | 64.2 | Optical filter |
| 12 | ∞ | 0.740 | | | |
| 13 | ∞ | | | | Image plane |

In Table 23, * represents an aspherical surface, and values of conic coefficient K and aspherical coefficients A, B, C, D, E and F in the twelfth embodiment according to Equation 1 are noted in Table 24 below.

TABLE 24

| Surface No. | K | A | B | C |
|---|---|---|---|---|
| 1 | −0.1503257E+01 | −0.57715464E−03 | −0.15043447E−02 | 0.217141615E−04 |
| 2 | −0.21566473E+01 | 0.10652303E−02 | −0.10862864E−02 | −0.33753821E−03 |
| 7 | −0.6427966E+01 | −0.27020876E−02 | −0.43560208E−02 | 0.241747197E−02 |
| 8 | −0.4620452E+01 | −0.64969274E−01 | 0.24603015E−01 | −0.54739765E−02 |
| 9 | −0.27499038E+03 | −0.38480857E−01 | 0.18837664E−02 | 0.45889099E−02 |
| 10 | −0.8229646E+01 | −0.28248956E−01 | 0.53822570E−02 | −0.7357206E−03 |

| Surface No. | D | E | F |
|---|---|---|---|
| 1 | −0.3521768E−03 | | |
| 2 | −0.19453830E−03 | | |
| 7 | 0.79775377E−04 | −0.60289779E−04 | |
| 8 | 0.66075937E−03 | 0.334774169E−04 | |
| 9 | −0.18543626E−02 | 0.293054803E−03 | −0.1633359E−04 |
| 10 | 0.47602796E−04 | −0.12907503E−05 | |

Thirteenth Embodiment

Following table 25 shows numeric values of the lens system according to a thirteenth embodiment of the present invention.

Figure 25:
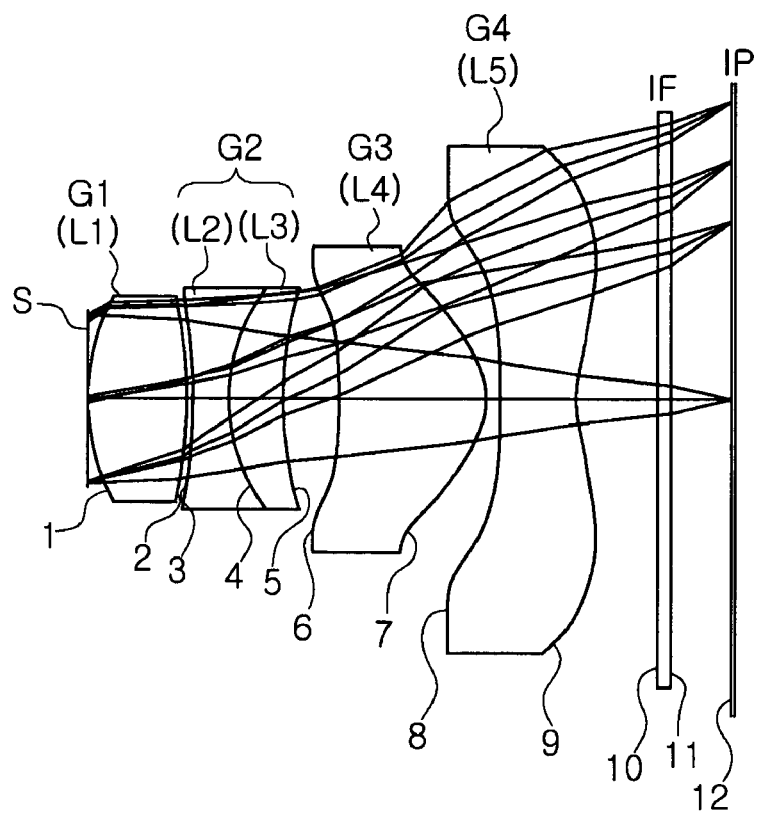
FIG. 25 is a lens configuration view illustrating a high-definition imaging optical system according to a thirteenth embodiment of the invention.
Figures 26A, 26B, 26C:
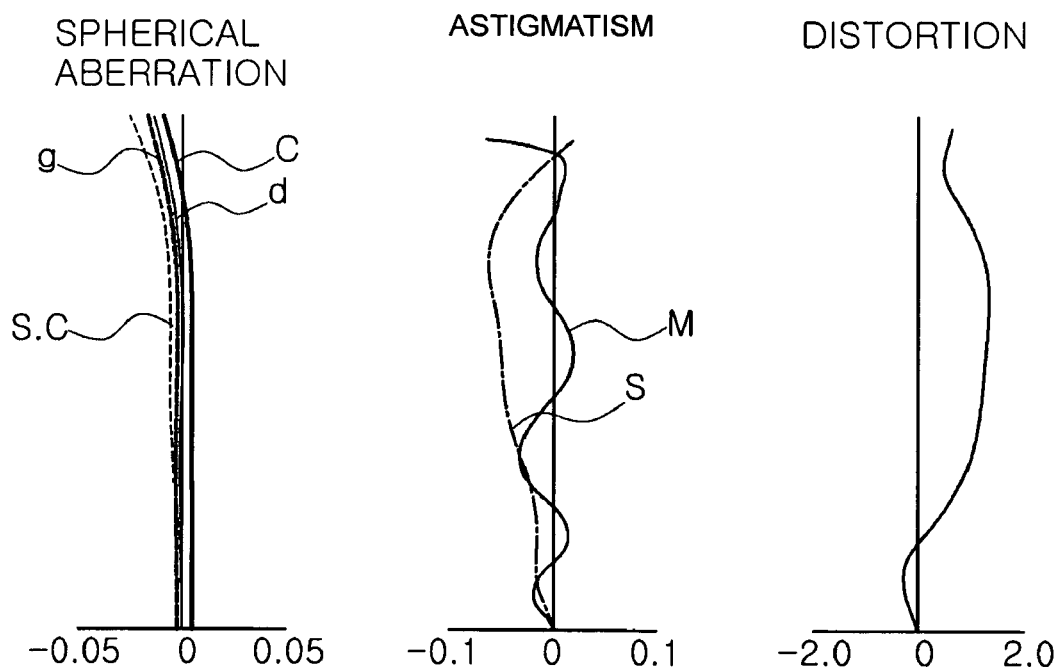
FIGS. 26A to 26C are graphs illustrating aberrations of the optical system shown in FIG. 25.

FIG. 25 is a view illustrating a lens arrangement of the high-definition imaging optical system according to the thirteenth embodiment of the invention, and FIGS. 26A to 26C show aberrations of the embodiment shown in Table 25 and FIG. 25.

In the thirteenth embodiment, an effective focal length f is 5.625 mm, an F number Fno is 2.8, an angle of view 2ω is 64.6° degrees, a total length TL from an object-side surface of the first lens group to the image plane is 7.26 mm.

A focal length f1 of the first lens L1 is 3.662 mm, a combined focal length of the second and third lenses L2 and L3, i.e., a focal length of the second lens group designated with f23 is −5.031 mm, a focal length f4 of the fourth lens L4 is 2.857 mm and a focal length f5 of the fifth lens L5 is −2.760 mm.

TABLE 25

| Surface No. | Radius of curvature (R) | Thickness or distance (t) | Refractive index ($N_d$) | Abbe number ($V_d$) | Remark |
|---|---|---|---|---|---|
| *1 | 3.0266 | 1.265 | 1.5714 | 61.65 | First lens |
| *2 | −5.7499 | 0.060 | | | |
| 3 | −7.6154 | 0.400 | 1.6200 | 36.30 | Second lens |
| 4 | 2.4951 | 0.721 | 1.6975 | 57.14 | Third lens |
| 5 | 4.8738 | 0.697 | | | |
| *6 | −10.7681 | 1.432 | 1.5300 | 55.75 | Fourth lens |
| *7 | −1.3886 | 0.272 | | | |
| *8 | −6.8778 | 0.700 | 1.5300 | 55.75 | Fifth lens |
| *9 | 1.9236 | 1.000 | | | |
| 10 | ∞ | 0.145 | 1.5168 | 64.20 | Optical filter |
| 11 | ∞ | 0.577 | | | |
| 12 | ∞ | | | | Image plane |

In Table 25, * represents an aspherical surface, and values of conic coefficient K and aspherical coefficients A, B, C, D, E and F in the thirteenth embodiment according to Equation 1 are noted in Table 26 below.

TABLE 26

| Surface No. | K | A | B | C |
|---|---|---|---|---|
| 1 | −0.25533242E+01 | 0.99562659E−02 | −0.16286273E−02 | 0.59264121E−03 |
| 2 | −0.82523331E+01 | −0.57054590E−03 | −0.34086320E−02 | 0.16813959E−02 |
| 6 | −0.16627724E+02 | −0.13160538E−01 | −0.56040545E−02 | −0.12202392E−02 |
| 7 | −.53804587E+01 | −0.74625118E−01 | 0.28048497E−01 | −0.76345772E−02 |
| 8 | −0.35000000E+03 | −0.49034487E−01 | −0.30353568E−02 | 0.70415987E−02 |
| 9 | −0.58840543E+01 | −0.43801351E−01 | 0.89148059E−02 | −0.11753407E−02 |

| Surface No. | D | E | F |
|---|---|---|---|
| 1 | −0.28953424E−03 | | |
| 2 | −0.59981423E−03 | | |
| 6 | 0.79404659E−03 | 0.10829483E−04 | |
| 7 | 0.69437824E−03 | 0.10699178E−03 | |
| 8 | −0.21180629E−02 | 0.28274985E−03 | −0.14219616E−04 |
| 9 | 0.74946685E−04 | −0.20016815E−05 | |

Fourteenth Embodiment

Following table 27 shows numeric values of the lens system according to a fourteenth embodiment of the present invention.

Figure 27:
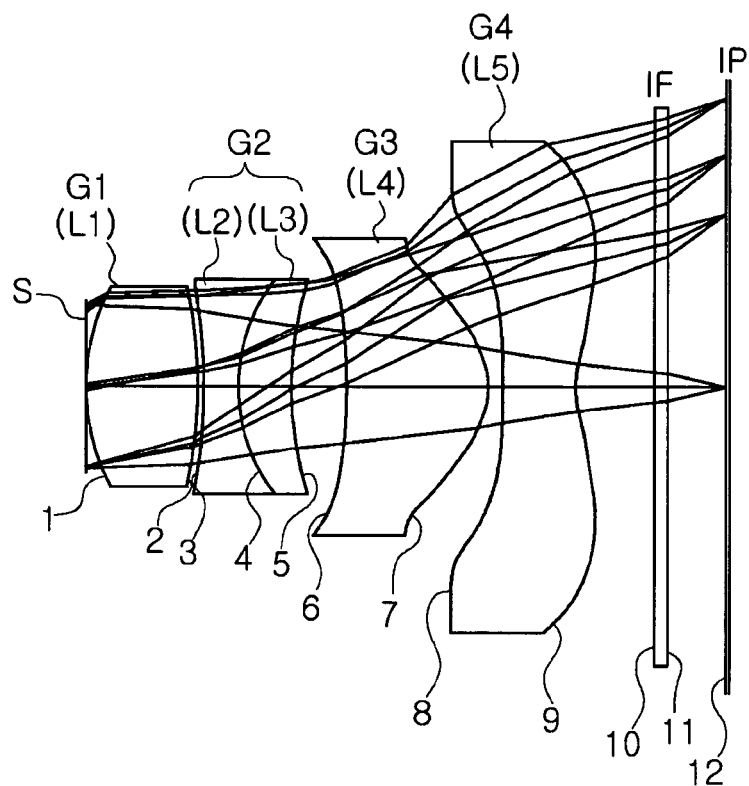
FIG. 27 is a lens configuration view illustrating a high-definition imaging optical system according to a fourteenth embodiment of the invention.
Figure 28A:
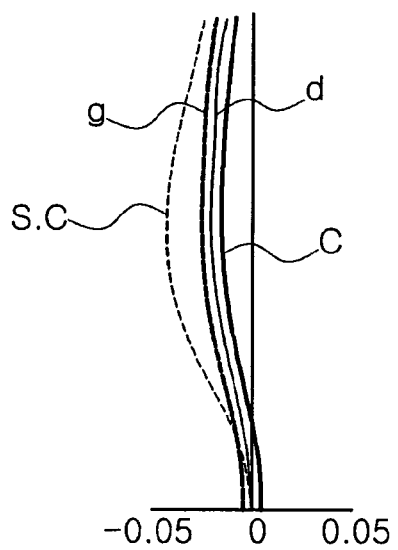
FIGS. 28A to 28C are graphs illustrating aberrations of the optical system shown in FIG. 27.
Figure 28B:
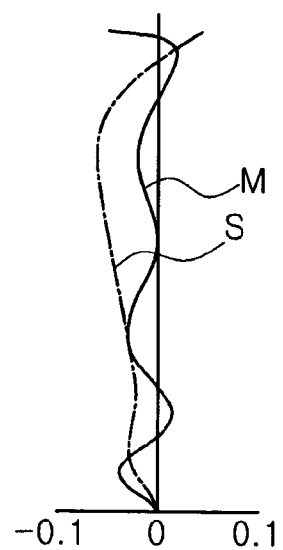
Figure 28C:
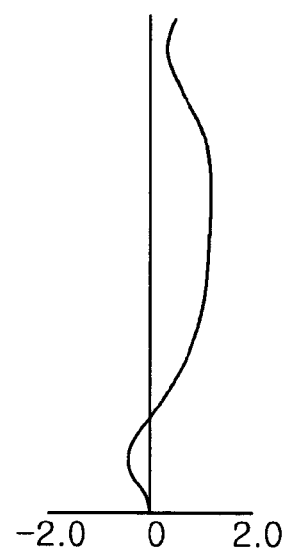

FIG. 27 is a view illustrating a lens arrangement of the high-definition imaging optical system according to the thirteenth embodiment of the invention, and FIGS. 28A to 28C show aberrations of the embodiment shown in Table 27 and FIG. 27.

In the fourteenth embodiment, an effective focal length f is 5.637 mm, an F number Fno is 2.8, an angle of view 2ω is 64.6° degrees, a total length TL from an object-side surface of the first lens group to the image plane is 7.19 mm.

A focal length f1 of the first lens L1 is 3.508 mm, a combined focal length of the second and third lenses L2 and L3, i.e., a focal length of the second lens group designated with f23 is −4.394 mm, a focal length f4 of the fourth lens group L4 is 2.272 mm and a focal length f5 of the fifth lens group L5 is −2.186 mm.

TABLE

| Surface No. | Radius of curvature (R) | Thickness or distance (t) | Refractive index ($N_d$) | Abbe number ($V_d$) | Remark |
|---|---|---|---|---|---|
| *1 | 2.7881 | 1.291 | 1.5891 | 61.24 | First lens |
| *2 | −6.6148 | 0.060 | | | |
| 3 | −7.2035 | 0.400 | 1.6259 | 35.74 | Second lens |
| 4 | 2.7597 | 0.641 | 1.6200 | 62.25 | Third lens |
| 5 | 4.7297 | 0.677 | | | |
| *6 | −13.4886 | 1.437 | 1.5300 | 55.75 | Fourth lens |
| *7 | −1.1462 | 0.100 | | | |
| *8 | −6.2295 | 0.759 | 1.5300 | 55.75 | Fifth lens |
| *9 | 1.4829 | 1.000 | | | |
| 10 | ∞ | 0.145 | 1.5168 | 64.20 | Optical filter |
| 11 | ∞ | 0.693 | | | |
| 12 | ∞ | | | | Image plane |

In Table 27, * represents an aspherical surface, and values of conic coefficient K and aspherical coefficients A, B, C, D, E and F in the fourteenth embodiment according to Equation 1 are noted in Table 28 below.

TABLE 28

| Surface No. | K | A | B | C |
|---|---|---|---|---|
| 1 | −0.17374578E+01 | 0.10700196E−01 | −0.65467973E−03 | 0.10509947E−02 |
| 2 | −0.72949803E+01 | 0.54650406E−02 | −0.84620505E−03 | 0.75576762E−03 |
| 6 | −0.26584131E+02 | −0.86367117E−02 | −0.63076341E−02 | −0.13585636E−02 |
| 7 | −0.48592648E+01 | −0.72215449E−01 | 0.26070742E−01 | −0.72658522E−02 |
| 8 | −0.33732185E+03 | −0.52360664E−01 | −0.15133003E−02 | 0.69461443E−02 |
| 9 | −0.69368384E+01 | −0.38836165E−01 | 0.76986160E−02 | −0.10164908E−02 |

| Surface No. | D | E | F |
|---|---|---|---|
| 1 | −0.35469083E−03 | | |
| 2 | −0.29602643E−03 | | |
| 6 | 0.12382542E−02 | −0.16454044E−03 | |
| 7 | 0.78941850E−03 | 0.81692928E−04 | |
| 8 | −.21219507E−02 | 0.28397875E−03 | −0.14416653E−04 |
| 9 | 0.64937792E−04 | −0.17657091E−05 | |

Fifteenth Embodiment

Following table 29 shows numeric values of the lens system according to a fifteenth embodiment of the present invention.

Figure 29:
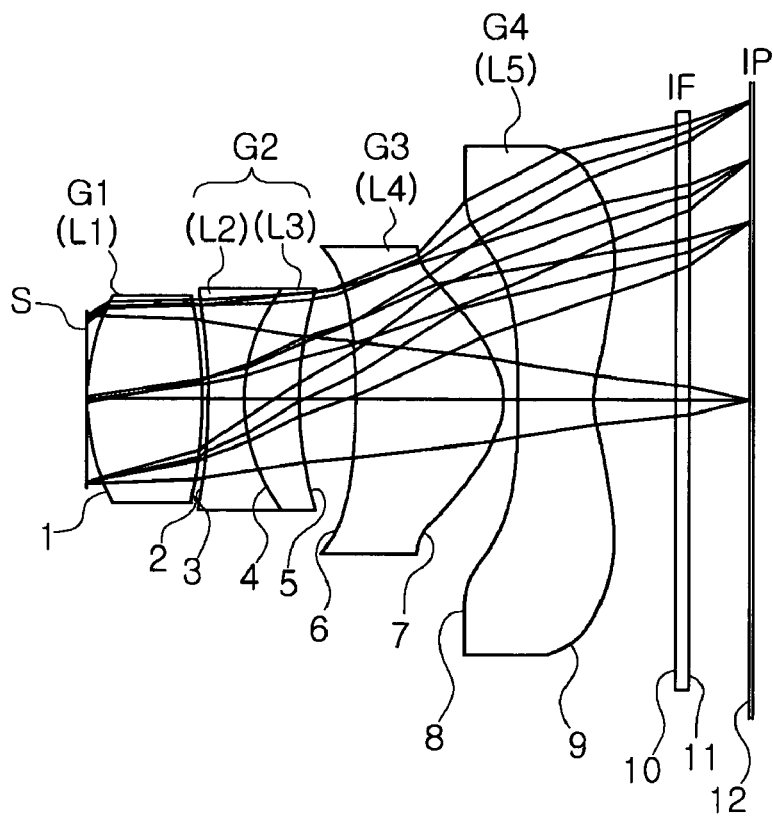
FIG. 29 is a lens configuration view illustrating a high-definition imaging optical system according to a fifteenth embodiment of the invention.
Figures 30A, 30B, 30C:
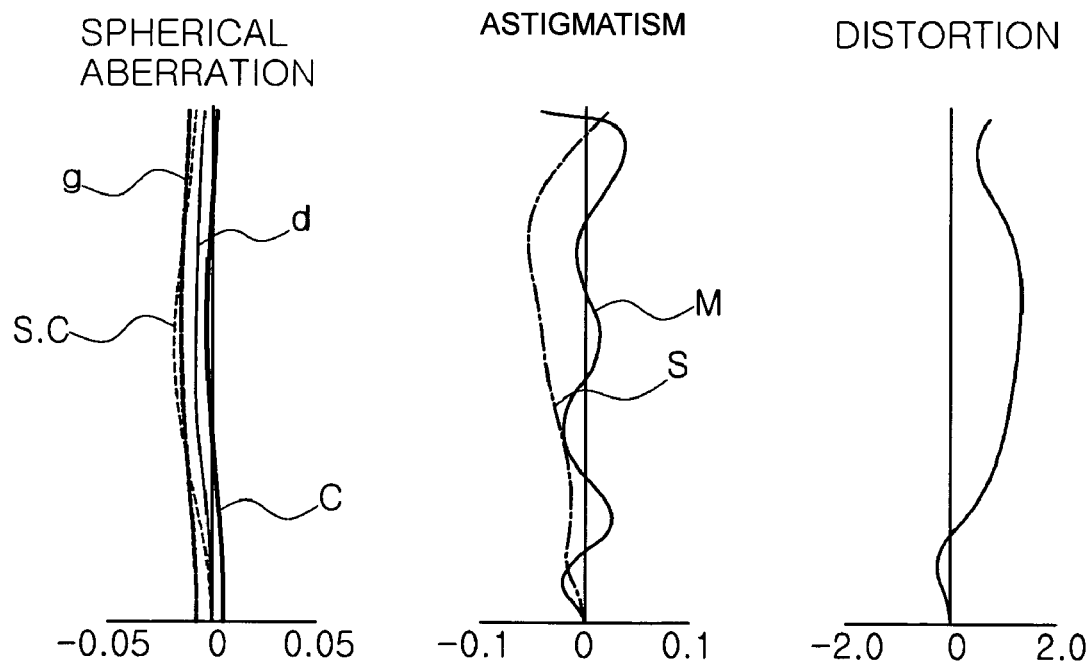
FIGS. 30A to 30C are graphs illustrating aberrations of the optical system shown in FIG. 29.

FIG. 29 is a view illustrating a lens arrangement of the high-definition imaging optical system according to the fifteenth embodiment of the invention, and FIGS. 30A to 30C show aberrations of the embodiment shown in Table 29 and FIG. 29.

In the fifteenth embodiment, an effective focal length f is 5.624 mm, an F number Fno is 2.8, an angle of view 2ω is 64.6° degrees, a total length TL from an object-side surface of the first lens group to the image plane is 7.10 mm.

A focal length f1 of the first lens L1 is 3.488 mm, a combined focal length of the second and third lenses L2 and L3, i.e., a focal length of the second lens group designated with f23 is −4.582 mm, a focal length f4 of the fourth lens L4 is 2.612 mm and a focal length f5 of the fifth lens L5 is −2.475 mm.

TABLE 29

| Surface No. | Radius of curvature (R) | Thickness or distance (t) | Refractive index ($N_d$) | Abbe number ($V_d$) | Remark |
|---|---|---|---|---|---|
| *1 | 2.8331 | 1.255 | 1.5711 | 61.28 | First lens |
| *2 | −5.6305 | 0.060 | | | |
| 3 | −7.5287 | 0.400 | 1.6200 | 36.30 | Second lens |
| 4 | 2.6732 | 0.671 | 1.6231 | 61.04 | Third lens |
| 5 | 4.7921 | 0.721 | | | |
| *6 | −10.1822 | 1.317 | 1.5300 | 55.75 | Fourth lens |
| *7 | −1.2733 | 0.199 | | | |
| *8 | −6.5364 | 0.730 | 1.5300 | 55.75 | Fifth lens |
| *9 | 1.7390 | 1.000 | | | |
| 10 | ∞ | 0.145 | 1.5168 | 64.20 | Optical filter |
| 11 | ∞ | 0.610 | | | |
| 12 | ∞ | | | | Image plane |

In Table 29, * represents an aspherical surface, and values of conic coefficient K and aspherical coefficients A, B, C, D, E and F in the fifteenth embodiment according to Equation 1 are noted in Table 30 below.

TABLE 30

| Surface No. | K | A | B | C |
|---|---|---|---|---|
| 1 | −0.23669120E+01 | 0.11558173E−01 | −0.12872830E−02 | 0.18278530E−03 |
| 2 | −0.80661321E+01 | 0.50827740E−03 | −0.25062574E−02 | 0.10180484E−02 |
| 6 | −0.19000000E+02 | −0.11410235E−01 | −0.66394114E−02 | −0.12277841E−02 |
| 7 | −0.51168386E+01 | −0.72976264E−01 | 0.26948494E−01 | −0.77097870E−02 |
| 8 | −0.34309362E+03 | −0.50403106E−01 | −0.23310587E−02 | 0.70136439E−02 |
| 9 | −0.66011015E+01 | −0.41087995E−01 | 0.82704734E−02 | −0.11089711E−02 |

| Surface No. | D | E | F |
|---|---|---|---|
| 1 | −0.17285699E−03 | | |
| 2 | −0.54960975E−03 | | |
| 6 | 0.78750047E−03 | −0.46557898E−04 | |
| 7 | 0.73288983E−03 | 0.12130161E−03 | |
| 8 | −0.21221281E−02 | 0.28290237E−03 | −0.14261253E−04 |
| 9 | 0.71658892E−04 | −0.19783432E−05 | |

Sixteenth Embodiment

Following table 31 shows numeric values of the lens system according to a sixteenth embodiment of the present invention.

Figure 31:
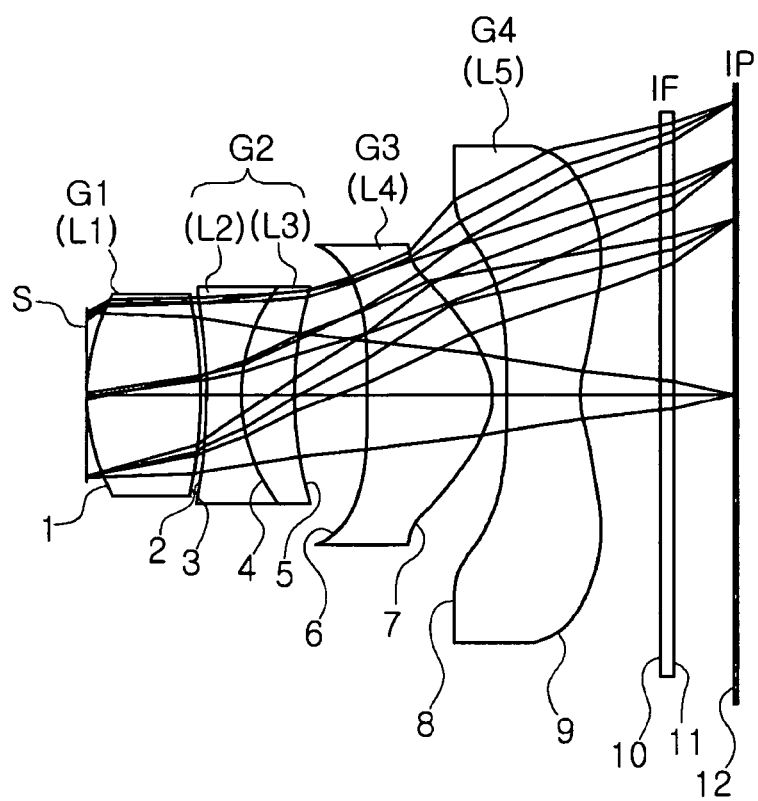
FIG. 31 is a lens configuration view illustrating a high-definition imaging optical system according to a sixteenth embodiment of the invention.
Figures 32A, 32B, 32C:
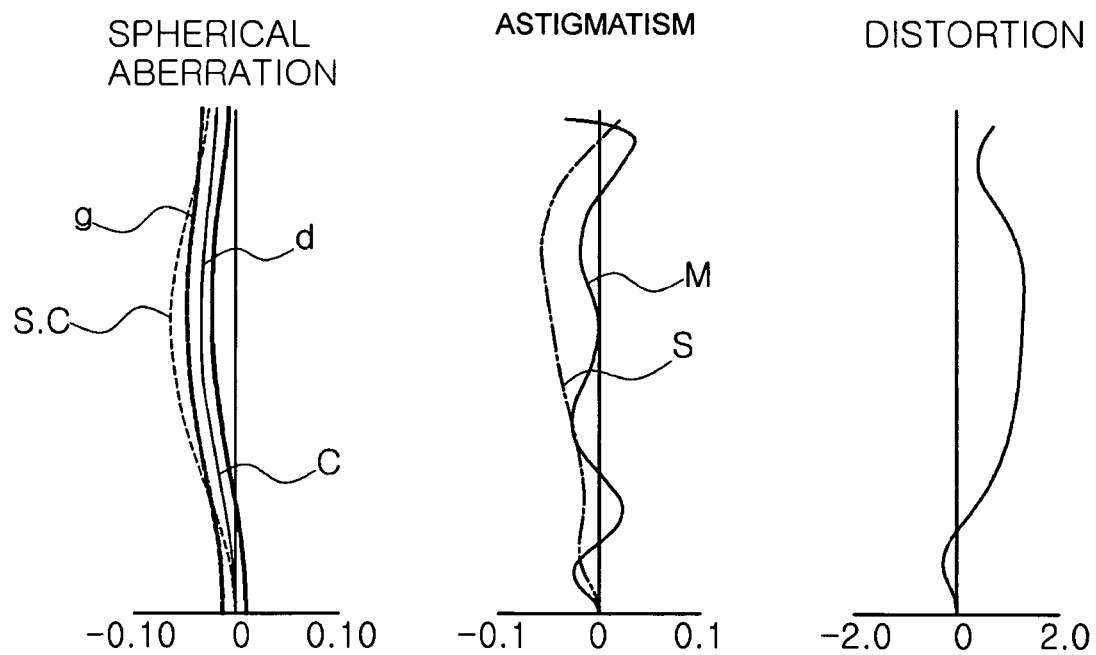
FIGS. 32A to 32C are graphs illustrating aberrations of the optical system shown in FIG. 31.

FIG. 31 is a view illustrating a lens arrangement of the high-definition imaging optical system according to the sixteenth embodiment of the invention, and FIGS. 32A to 32C show aberrations of the embodiment shown in Table 31 and FIG. 31.

In the sixteenth embodiment, an effective focal length f is 5.628 mm, an F number Fno is 2.8, an angle of view 2ω is 64.6° degrees, a total length TL from an object-side surface of the first lens group to the image plane is 7.0 mm.

A focal length f1 of the first lens L1 is 3.539 mm, a combined focal length of the second and third lenses L2 and L3, i.e., a focal length of the second lens group designated with f23 is −4.745 mm, a focal length f4 of the fourth lens L4 is 2.641 mm and a focal length f5 of the fifth lens L5 is −2.3099 mm.

TABLE 31

| Surface No. | Radius of curvature (R) | Thickness or distance (t) | Refractive index ($N_d$) | Abbe number ($V_d$) | Remark |
|---|---|---|---|---|---|
| *1 | 2.7206 | 1.139 | 1.5610 | 62.43 | First lens |
| *2 | −6.2395 | 0.060 | | | |
| 3 | −9.2051 | 0.400 | 1.6200 | 36.30 | Second lens |
| 4 | 2.6597 | 0.638 | 1.6000 | 62.57 | Third lens |
| 5 | 4.6270 | 0.829 | | | |
| *6 | −10.1122 | 1.222 | 1.5300 | 55.75 | Fourth lens |
| *7 | −1.2035 | 0.135 | | | |
| *8 | −6.0433 | 0.785 | 1.5300 | 55.75 | Fifth lens |
| *9 | 1.6032 | 1.000 | | | |
| 10 | ∞ | 0.145 | 1.5168 | 64.20 | Optical filter |
| 11 | ∞ | 0.660 | | | |
| 12 | ∞ | | | | Image plane |

In Table 31, * represents an aspherical surface, and values of conic coefficient K and aspherical coefficients A, B, C, D, E and F in the sixteenth embodiment according to Equation 1 are noted in Table 32 below.

TABLE 32

| Surface No. | K | A | B | C |
|---|---|---|---|---|
| 1 | −0.20949863E+01 | 0.11839041E−01 | −0.11071962E−02 | 0.32261028E−03 |
| 2 | −0.74445776E+01 | 0.26564754E−02 | −0.76592595E−03 | −0.32857316E−03 |
| 6 | −0.14294493E+02 | −0.99088647E−02 | −0.52376180E−02 | −0.33060517E−02 |
| 7 | −0.49280732E+01 | −0.71494282E−01 | 0.26136574E−01 | −0.76651741E−02 |
| 8 | −0.28054865E+03 | −0.50306377E−01 | −0.18900936E−02 | 0.69823706E−02 |
| 9 | −0.68789873E+01 | −0.39161623E−01 | 0.78878600E−02 | −0.10779920E−02 |

| Surface No. | D | E | F |
|---|---|---|---|
| 1 | −0.24616940E−03 | | |
| 2 | −0.25098870E−03 | | |
| 6 | 0.17593989E−02 | −0.25477867E−03 | |
| 7 | 0.72199179E−03 | 0.13168283E−03 | |
| 8 | −0.21269429E−02 | 0.28441627E−03 | −0.14431923E−04 |
| 9 | 0.70966961E−04 | −0.19796703E−05 | |

Values of conditions 1 to 6-1 for the above first to twelve embodiments are noted in Table 33.

TABLE 33

| Embodiment | Condition 1 | Condition 2-1 | Condition 3-1 | Condition 4-1 | Condition 5-1 | Condition 5-2 | Condition 6-1 |
|---|---|---|---|---|---|---|---|
| 1 | 1.143 | 0.611 | 1.222 | −2.060 | 55.50 | 36.30 | −1.178 |
| 2 | 1.144 | 0.642 | 1.247 | −1.780 | 55.50 | 36.30 | −1.155 |
| 3 | 1.193 | 0.624 | 1.318 | −1.721 | 55.50 | 36.30 | −1.049 |
| 4 | 1.193 | 0.602 | 1.304 | −2.278 | 55.50 | 36.30 | −1.067 |
| 5 | 1.253 | 0.622 | 1.235 | −1.098 | 55.50 | 36.30 | −1.053 |
| 6 | 1.256 | 0.630 | 1.258 | −1.319 | 55.50 | 36.30 | −1.034 |
| 7 | 1.329 | 0.778 | 1.311 | −1.086 | 55.50 | 35.70 | −1.021 |
| 8 | 1.330 | 0.782 | 1.323 | −1.228 | 55.50 | 36.30 | −1.023 |
| 9 | 1.388 | 0.872 | 1.313 | −1.209 | 53.50 | 37.00 | −1.031 |
| 10 | 1.394 | 0.808 | 1.380 | −1.631 | 55.50 | 36.30 | −1.025 |
| 11 | 1.262 | 0.675 | 1.282 | −1.326 | 55.50 | 36.30 | −1.032 |
| 12 | 1.328 | 0.806 | 1.391 | −1.428 | 55.50 | 36.30 | −0.994 |

Also, values of conditions 1 and 2-2 to 6-2 for the above thirteenth to sixteenth embodiments are noted in Table 34.

TABLE 34

| Embodiment | Condition 1 | Condition 2-2 | Condition 3-2 | Condition 4-2 | Condition 5-3 | Condition 5-4 | Condition 5-5 | Condition 6-2 |
|---|---|---|---|---|---|---|---|---|
| 13 | 1.290 | 0.651 | 1.349 | −1.914 | 61.65 | 36.30 | 57.14 | −1.035 |
| 14 | 1.275 | 0.622 | 1.474 | −2.393 | 61.24 | 35.74 | 62.25 | −1.040 |
| 15 | 1.263 | 0.620 | 1.349 | −1.811 | 61.68 | 36.30 | 61.04 | −1.056 |
| 16 | 1.244 | 0.629 | 1.353 | −1.797 | 62.43 | 36.30 | 62.57 | −1.066 |

As shown in Table 21 above, the first to sixteenth embodiments of the present invention satisfy conditions 1 to 6-2, and as shown in FIGS. 2, 4, 6, 8, 10, 12, 14, 16, 18, 20, 22, 24, 26, 28, 30 and 32, the imaging optical system superior in aberrational characteristics can be obtained.

As set forth above, according to exemplary embodiments of the invention, an imaging optical system ensures high-definition, and is compact due to the small number of lenses employed.

Also, the imaging optical system is further increased in definition and superbly corrects chromatic aberration to improve color fringing in the case of indoor or outdoor photographing, thereby enhancing quality and reliability.

In addition, a lens made of plastic is utilized to reduce weight, thus allowing the optical system to be manufactured easily in mass production at a low cost.

While the present invention has been shown and described in connection with the exemplary embodiments, it will be apparent to those skilled in the art that modifications and variations can be made without departing from the spirit and scope of the invention as defined by the appended claims.

What is claimed is:

1. An imaging optical system comprising:
    an aperture stop;
    a first lens disposed at an image side of the aperture stop, the first lens having a positive refractive power and the front surface of the first lens having a convex object-side surface;
    a second lens disposed at an image side surface of the first lens, the front surface of the second lens having a concave object-side surface;
    a third lens disposed at an image side surface of the second lens, the rear surface of the third lens having a concave image-side surface;
    a fourth lens disposed at an image side surface of the third lens, the fourth lens having a positive refractive power and the rear surface of the fourth lens having a convex image-side surface; and
    a fifth lens having a negative refractive power and the rear surface of the fifth lens having a concave image-side surface,
    wherein a combined refractive power of the second and third lenses is negative.

2. The imaging optical system of claim 1, wherein the second and third lenses are cemented together or spaced apart from each other at a predetermined distance.

3. The imaging optical system of claim 2, wherein one of the fourth and fifth lenses has at least one surface formed of an aspherical surface.

4. The imaging optical system of claim 3, having a dimension in an optical axis direction satisfying following condition 1:

$$1.0 < TL/f < 1.5 \qquad \text{condition 1,}$$

where TL is a distance from the object-side surface of the first lens to an image plane and f is a total focal length of the optical system.

5. The imaging optical system of claim 3, wherein the first lens has a refractive power satisfying following condition 2-1:

$$0.5 \leq f1/f \leq 1.0 \qquad \text{condition 2-1,}$$

where f1 is a focal length of the first lens.

6. The imaging optical system of claim 3, wherein the first, second and third lenses have a refractive power satisfying following condition 3-1:

$$1.1 < f123/f \leq 1.5 \qquad \text{condition 3-1,}$$

where f123 is a combined focal length of the first, second and third lenses.

7. The imaging optical system of claim 3, wherein the fourth lens has a shape satisfying following condition 4-1:

$$-2.5 < R\_L4F/f < -1.0 \qquad \text{condition 4-1,}$$

where R_L4F is a radius of curvature of an object-side surface of the fourth lens.

8. The imaging optical system of claim 3, wherein the second and third lenses have Abbe numbers satisfying following conditions 5-1 and 5-2, respectively:

$$45 < V\_L2 < 71 \qquad \text{condition 5-1}$$

$$23 < V\_L3 < 40 \qquad \text{condition 5-2,}$$

where V_L2 is an Abbe number of the second lens and V_L3 is an Abbe number of the third lens.

9. The imaging optical system of claim 3, wherein the fourth and fifth lenses have a refractive power satisfying following condition 6-1:

$$-1.4 < f4/f5 < -0.8 \qquad \text{condition 6-1}$$

where f4 is a focal length of the fourth lens and f5 is a focal length of the fifth lens.

10. The imaging optical system of claim 1, wherein the second lens has a negative refractive power and the third lens has a positive refractive power.

11. The imaging optical system of claim 10, wherein one of the fourth and fifth lenses has at least one surface formed of an aspherical surface.

12. The imaging optical system of claim 11, having a dimension in an optical axis direction satisfying following condition 1:

$$1.0 < TL/f < 1.5 \qquad \text{condition 1,}$$

where TL is a distance from the object-side surface of the first lens to an image plane and f is a total focal length of the optical system.

13. The imaging optical system of claim 11, wherein the first lens has a refractive power satisfying following condition 2-2:

$$0.4 < f1/f < 0.9 \qquad \text{condition 2-2,}$$

where f1 is a focal length of the first lens.

14. The imaging optical system of claim 11, wherein the first, second and third lenses have a refractive power satisfying following condition 3-2:

$$1.1 < f123/f < 1.7 \qquad \text{condition 3-2,}$$

f123 is a combined focal length of the first and second lenses.

15. The imaging optical system of claim 11, wherein the fourth lens has a shape satisfying following condition 4-1:

$$-3.0 < R\_L4F/f < -0.0 \qquad \text{condition 4-1,}$$

where R_L4F is a radius of curvature of an object-side surface of the fourth lens.

16. The imaging optical system of claim 11, wherein the first, second and third lenses have Abbe numbers satisfying following conditions 5-3, 5-4 and 5-5, respectively:

$$50 < V\_L1 < 70 \qquad \text{condition 5-3,}$$

$$25 < V\_L2 < 45 \qquad \text{condition 5-4,}$$

$$50 \leq V\_L3 < 70 \qquad \text{condition 5-5,}$$

where V_L1 is an Abbe number of the first lens, V_L2 is an Abbe number of the second lens and V_L3 is an Abbe number of the third lens.

17. The imaging optical system of claim 11, wherein the first lens and fifth lenses have a refractive power satisfying following condition 6-2:

$$-1.4 < f4/f5 < -0.7 \qquad \text{condition 6-2,}$$

where f4 is a focal length of the fourth lens and f5 is a focal length of the fifth lens.

18. The imaging optical system of claim 1, having a dimension in an optical axis direction satisfying following condition 1, and wherein the first lens has a refractive power satisfying following condition 2-1:

$$1.0 < TL/f < 1.5 \qquad \text{condition 1,}$$

$$0.5 < f1/f < 1.0 \qquad \text{condition 2-1,}$$

where TL is a distance from the object-side surface of the first lens to an image plane, f is a total focal length of the optical system and f1 is a focal length of the first lens.

19. The imaging optical system of claim 18, wherein the first, second and third lenses have a refractive power satisfying following condition 3-1:

$$1.1 < f123/f < 1.5 \qquad \text{condition 3-1,}$$

where f123 is a combined focal length of the first, second and third lenses.

20. The imaging optical system of claim 1, having a dimension in an optical axis direction satisfying following condition 1, and wherein the first lens has a refractive power satisfying following condition 2-2:

$$1.0 TL/f < 1.5 \qquad \text{condition 1,}$$

$$0.4 < f1/f < 0.9 \qquad \text{condition 2-2,}$$

where TL is a distance from the object-side surface of the first lens to an image plane, f is a total focal length of the optical system and f1 is a focal length of the first lens.

21. The imaging optical system of claim 20, wherein the first, second and third lenses have a refractive power satisfying following condition 3-2:

$$1.1 < f123/f < 1.7 \qquad \text{condition 3-2,}$$

where f123 is a combined focal length of the first, second and third lenses.

22. An imaging optical system comprising:

an aperture stop;

a first lens disposed at an image side of the aperture stop, the first lens having a positive refractive power and the front surface of the first lens having a convex object-side surface;

a second lens disposed at an image side surface of the first lens;

a third lens disposed at an image side surface of the second lens;

a fourth lens having a positive refractive power and the rear surface of the fourth lens having a convex image-side surface; and a fifth lens having a negative refractive power and the rear surface of the fifth lens having a concave image-side surface, wherein a combined refractive power of the second and third lenses is negative and the second lens has a positive refractive power and the third lens has a negative refractive power.

23. An imaging optical system comprising:

an aperture stop;

a first lens disposed at an image side of the aperture stop, the first lens having a positive refractive power and having both convex surfaces;

a second lens disposed at an image-side surface of the first lens, the front surface of the second lens having a concave object-side surface;

a third lens disposed at an image-side surface of the second lens, the third lens cemented to the second lens or spaced apart from the second lens at a predetermined distance, the rear surface of the third lens having a concave image-side surface;

a fourth lens disposed at an image side surface of the third lens, the fourth lens having a positive refractive power and having a convex image-side surface; and a fifth lens having a negative refractive power and having a concave image-side surface, the fifth lens having at least one surface formed of an aspherical surface, wherein a combined refractive power of the second and third lenses is negative.

24. The imaging optical system of claim 23, having a dimension in an optical axis direction satisfying following condition 1:

$$1.0 < TL/f < 1.5 \qquad \text{condition 1,}$$

where TL is a distance from an object-side surface of the first lens to an image plane and f is a total focal length of the optical system.

25. The imaging optical system of claim 24, wherein the second lens has a positive refractive power and the third lens has a negative refractive power.

26. The imaging optical system of claim 24, wherein the second lens has a negative refractive power and the third lens has a positive refractive power.

27. The imaging optical system of claim 24, wherein the fifth lens has a point of inflection formed on the image-side surface thereof.

28. The imaging optical system of claim 23, wherein the fourth lens has at least one surface formed of an aspherical surface.

29. The imaging optical system of claim 28, wherein the second lens has a positive refractive power and the third lens has a negative refractive power.

30. The imaging optical system of claim 28, wherein the second lens has a negative refractive power and the third lens has a positive refractive power.

31. The imaging optical system of claim 28, wherein the fifth lens has the image-side surface convexed toward an object side near an optical axis and convexed toward an image plane at peripheral portions.

* * * * *

UNITED STATES PATENT AND TRADEMARK OFFICE
CERTIFICATE OF CORRECTION

PATENT NO. : 7,710,665 B2
APPLICATION NO. : 12/232385
DATED : May 4, 2010
INVENTOR(S) : Cheon Ho Park et al.

It is certified that error appears in the above-identified patent and that said Letters Patent is hereby corrected as shown below:

Column 32, Line 17, change

"$0.5 \leqq f1/f \leqq 1.0$" to --$0.5 < f1/f < 1.0$--

Column 32, Line 23, change

"$1.1 < f123/f \leqq 1.5$" to --$1.1 < f123/f < 1.5$--

Column 33, Line 21, change

"$50 \leqq V\_L3 < 70$" to --$50 < V\_L3 < 70$--

Column 33, Line 55, change

"$1.0 TL/f < 1.5$" to --$1.0 < TL/f < 1.5$--

Signed and Sealed this
Fourth Day of January, 2011

David J. Kappos
*Director of the United States Patent and Trademark Office*